United States Patent
Nadakuduti et al.

(10) Patent No.: US 12,471,040 B2
(45) Date of Patent: Nov. 11, 2025

(54) ENERGY ALLOCATION AMONG MULTIPLE RADIOS FOR RADIO FREQUENCY (RF) EXPOSURE COMPLIANCE

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/061,398

(22) Filed: Dec. 2, 2022

(65) Prior Publication Data

US 2023/0180150 A1 Jun. 8, 2023

Related U.S. Application Data

(60) Provisional application No. 63/364,481, filed on May 10, 2022, provisional application No. 63/286,075, filed on Dec. 5, 2021.

(51) Int. Cl.
*H04W 52/36* (2009.01)
*H04W 52/34* (2009.01)

(52) U.S. Cl.
CPC ....... *H04W 52/367* (2013.01); *H04W 52/346* (2013.01)

(58) Field of Classification Search
CPC ... H04W 52/36; H04W 52/367; H04W 52/34; H04W 52/346
See application file for complete search history.

(56) References Cited

U.S. PATENT DOCUMENTS

| | | | | |
|---|---|---|---|---|
| 8,509,839 B2* | 8/2013 | Osterling | ............. | H04B 1/0053 |
| | | | | 455/127.1 |
| 9,246,656 B2* | 1/2016 | Kim | ...................... | H04W 72/23 |
| 10,057,794 B2* | 8/2018 | Wakabayashi | ........ | H04L 1/0026 |
| 10,652,833 B2 | 5/2020 | Nadakuduti et al. | | |
| 11,044,675 B2* | 6/2021 | Pelletier | ............. | H04W 52/367 |

(Continued)

FOREIGN PATENT DOCUMENTS

| | | | | |
|---|---|---|---|---|
| WO | WO-2017222754 A1 * | 12/2017 | ............ | H04W 24/10 |
| WO | 2020010232 A1 | 1/2020 | | |

(Continued)

OTHER PUBLICATIONS

International Search Report and Written Opinion—PCT/US2022/080883—ISA/EPO—Mar. 30, 2023.

*Primary Examiner* — Hai V Nguyen
(74) *Attorney, Agent, or Firm* — Patterson & Sheridan, L.L.P/Qualcomm Incorporated

(57) ABSTRACT

Certain aspects of the present disclosure provide techniques and apparatus for operating a wireless communication device pursuant to radio frequency (RF) exposure compliance. A method that may be performed by a wireless device includes determining a base reserve and a dynamic reserve for each of a plurality of radios; and transmitting a signal with at least one of the radios at a transmit power determined based at least in part on one or more maximum time-averaged RF exposure limits associated with each of the radios and on the base reserve and the dynamic reserve for each of the radios.

30 Claims, 10 Drawing Sheets

(56) References Cited

U.S. PATENT DOCUMENTS

| | | | |
|---|---|---|---|
| 11,178,623 B2* | 11/2021 | Wang | H04W 52/30 |
| 11,184,866 B2 | 11/2021 | Cai et al. | |
| 11,438,023 B1 | 9/2022 | Sambhwani et al. | |
| 12,047,169 B2* | 7/2024 | Park | H04L 5/0057 |
| 12,101,154 B2* | 9/2024 | Yao | H04B 7/0623 |
| 12,167,347 B2* | 12/2024 | Leroux | H04L 1/1812 |
| 2011/0195681 A1* | 8/2011 | Osterling | H04B 1/0053 455/127.1 |
| 2013/0310104 A1 | 11/2013 | Hamdi et al. | |
| 2014/0105155 A1* | 4/2014 | Kim | H04W 72/21 370/329 |
| 2015/0312783 A1* | 10/2015 | Wakabayashi | H04W 76/27 370/241.1 |
| 2017/0064641 A1* | 3/2017 | Logan | H04W 52/367 |
| 2017/0332282 A1* | 11/2017 | Dao | H04L 1/0002 |
| 2019/0037586 A1* | 1/2019 | Park | H04L 5/00 |
| 2020/0021421 A1 | 1/2020 | Han et al. | |
| 2021/0105084 A1* | 4/2021 | Gulati | H04L 1/0026 |
| 2022/0007399 A1* | 1/2022 | Rastegardoost | H04L 1/1861 |
| 2022/0021409 A1 | 1/2022 | Nadakuduti et al. | |
| 2022/0086770 A1 | 3/2022 | Curtiss et al. | |
| 2022/0116949 A1* | 4/2022 | Nadakuduti | H04W 72/0473 |
| 2022/0159582 A1* | 5/2022 | Lu | H04W 52/36 |
| 2022/0191730 A1* | 6/2022 | Meylan | H04W 28/0268 |
| 2022/0225455 A1* | 7/2022 | Jain | H04W 76/16 |
| 2022/0286974 A9* | 9/2022 | Nadakuduti | H04B 1/3838 |
| 2022/0302945 A1 | 9/2022 | Chen et al. | |
| 2022/0302946 A1 | 9/2022 | Jadhav et al. | |
| 2022/0330171 A1 | 10/2022 | Vashi et al. | |
| 2023/0105877 A1* | 4/2023 | Nadakuduti | H04W 52/225 455/522 |
| 2023/0156612 A1* | 5/2023 | Chen | H04W 52/42 370/318 |
| 2023/0156625 A1* | 5/2023 | Liu | H04W 52/365 455/522 |
| 2023/0180151 A1* | 6/2023 | Nadakuduti | H04W 52/367 370/318 |
| 2023/0353276 A1* | 11/2023 | Park | H04L 5/00 |

FOREIGN PATENT DOCUMENTS

| | | |
|---|---|---|
| WO | 2020072877 A1 | 4/2020 |
| WO | 2021229503 A1 | 11/2021 |

* cited by examiner

ENERGY ALLOCATION AMONG MULTIPLE RADIOS FOR RADIO FREQUENCY (RF) EXPOSURE COMPLIANCE

CROSS-REFERENCE TO RELATED APPLICATIONS

The present Application for Patent claims benefit of U.S. Provisional Application No. 63/286,075, filed Dec. 5, 2021; and U.S. Provisional Application No. 63/364,481, filed May 10, 2022, each of which is hereby expressly incorporated by reference herein in its entirety.

BACKGROUND

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by certain governments and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include allocating energy for each of a plurality of radios.

Certain aspects of the subject matter described in this disclosure can be implemented in a method for wireless communication by a wireless device. The method generally includes determining a base reserve and a dynamic reserve for each of a plurality of radios; and transmitting a signal with at least one of the radios at a transmit power determined based at least in part on one or more maximum time-averaged radio frequency (RF) exposure limits associated with each of the radios and on the base reserve and the dynamic reserve for each of the radios.

Certain aspects of the subject matter described in this disclosure can be implemented in a method for wireless communication by a wireless device. The method generally includes determining a base reserve for each of a plurality of radios, wherein the base reserve for each of the radios is a guaranteed reserve of transmit power regardless of whether the respective radio is operating; and transmitting a signal with at least one of the radios at a transmit power determined based at least in part on one or more maximum time-averaged RF exposure limits associated with each of the radios and on the base reserve for each of the radios.

Certain aspects of the subject matter described in this disclosure can be implemented in an apparatus for wireless communication. The apparatus generally includes a memory and a processor coupled to the memory. The processor and the memory are configured to determine a base reserve and a dynamic reserve for each of a plurality of radios; and transmit a signal with at least one of the radios at a transmit power determined based at least in part on one or more maximum time-averaged RF exposure limits associated with each of the radios and on the base reserve and the dynamic reserve for each of the radios.

Certain aspects of the subject matter described in this disclosure can be implemented in an apparatus for wireless communication. The apparatus generally includes a memory and a processor coupled to the memory. The processor and the memory are configured to determine a base reserve for each of a plurality of radios, wherein the base reserve for each of the radios is a guaranteed reserve of transmit power regardless of whether the respective radio is operating; and transmit a signal with at least one of the radios at a transmit power determined based at least in part on one or more maximum time-averaged RF exposure limits associated with each of the radios and on the base reserve for each of the radios.

Certain aspects of the subject matter described in this disclosure can be implemented in an apparatus for wireless communication. The apparatus generally includes means for determining a base reserve and a dynamic reserve for each of a plurality of radios; and means for transmitting a signal with at least one of the radios at a transmit power determined based at least in part on one or more maximum time-averaged RF exposure limits associated with each of the radios and on the base reserve and the dynamic reserve for each of the radios.

Certain aspects of the subject matter described in this disclosure can be implemented in an apparatus for wireless communication. The apparatus generally includes means for determining a base reserve for each of a plurality of radios, wherein the base reserve for each of the radios is a guaranteed reserve of transmit power regardless of whether the respective radio is operating; and means for transmitting a signal with at least one of the radios at a transmit power determined based at least in part on one or more maximum time-averaged RF exposure limits associated with each of the radios and on the base reserve for each of the radios.

Certain aspects of the subject matter described in this disclosure can be implemented in a computer-readable medium. The computer-readable medium has instructions stored thereon for determining a base reserve and a dynamic reserve for each of a plurality of radios; and transmitting a signal with at least one of the radios at a transmit power determined based at least in part on one or more maximum time-averaged RF exposure limits associated with each of the radios and on the base reserve and the dynamic reserve for each of the radios.

Certain aspects of the subject matter described in this disclosure can be implemented in a computer-readable medium. The computer-readable medium has instructions stored thereon for determining a base reserve for each of a plurality of radios, wherein the base reserve for each of the radios is a guaranteed reserve of transmit power regardless of whether the respective radio is operating; and transmitting a signal with at least one of the radios at a transmit power determined based at least in part on one or more maximum time-averaged RF exposure limits associated with each of the radios and on the base reserve for each of the radios.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
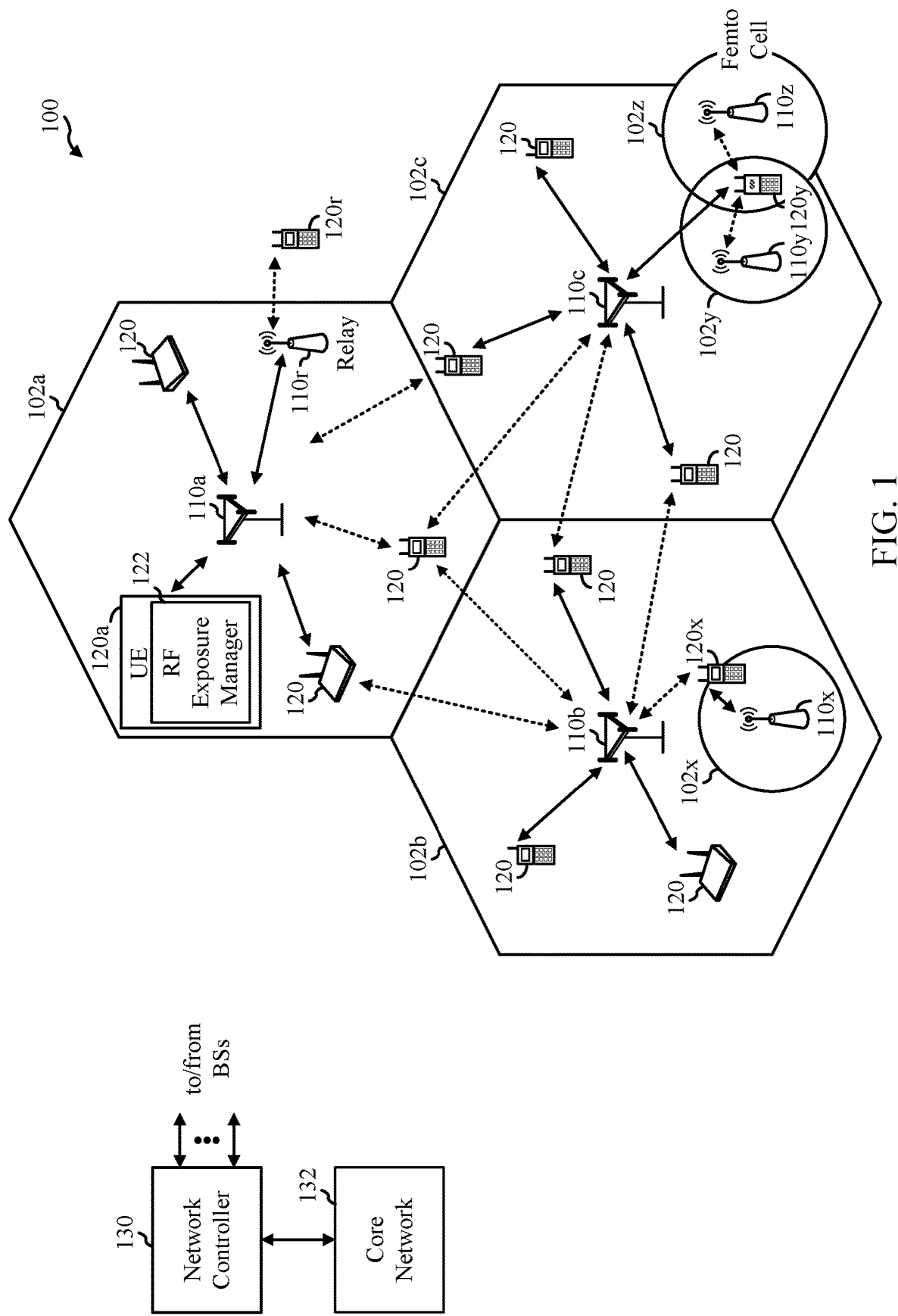
FIG. 1 is a block diagram conceptually illustrating an example wireless communication network, in accordance with certain aspects of the present disclosure.

Aspects of the present disclosure provide apparatus, methods, processing systems, and computer-readable mediums for energy allocation among multiple radios for radio frequency (RF) exposure compliance.

In certain cases, a wireless communication device (e.g., a user equipment) may track the RF exposure per active radio (e.g., a first radio for Long Term Evolution (LTE), a second radio for New Radio (NR), a third radio for Bluetooth, etc.) over time for time-averaged RF exposure compliance. The total available energy for RF exposure compliance may be allocated among active radios. For example, in a two-radio scenario, a first radio may be allocated x percentage (x %) of the total energy, and a second radio may be allocated the remainder of the total energy (e.g., 100%–x %). Such an approach for allocating the energy among the radios may be efficient when each of the radios fully uses the respective share of allocated energy. For example, if one of the radios does not consume all of the allocated energy for a given time window associated with an RF exposure limit, the wireless communication device may be wasting energy that could be allocated to another radio.

Aspects of the present disclosure provide apparatus and methods for allocating energy among multiple radios for RF exposure compliance. For example, certain reserve levels of exposure (or energy or transmit power) may be allocated to the radios to facilitate each radio's wireless communication link with other wireless devices, where the reserve levels may be determined based on certain criteria (e.g., network/ radio conditions and/or transmission duty cycle) associated with each radio. In certain cases, the time window used for evaluating time-averaged RF exposure compliance may be band specific. To account for a change in duration of a time window for evaluating time-averaged RF exposure compliance, the reserve(s) and/or margin(s) described herein may be converted to equivalent level(s) within a new time window for evaluating time-averaged RF exposure compliance in response to a transition to the new time window.

The apparatus and methods for allocating energy described herein may facilitate improved wireless communication performance, such as reduced latencies, increased data rates, improved signal qualities (e.g., at the edge of a cell), and/or enhanced communication range.

As used herein, a radio may refer to one or more active bands, transceivers, and/or radio access technologies (RATs) (e.g., code division multiple access (CDMA), LTE, NR, IEEE 802.11, Bluetooth, etc.) used for wireless communications. For example, for uplink carrier aggregation or dual connectivity in LTE and/or NR, each of the active component carriers used for wireless communications may be treated as a separate radio. Similarly, multi-band transmissions for IEEE 802.11 may be treated as separate radios for each band (e.g., 2.4 GHz, 5 GHz, or 6 GHz).

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability configurations. These services may also have different transmission time intervals (TTIs) to meet respective quality of service (QoS) specifications. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance using energy allocations per radio, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
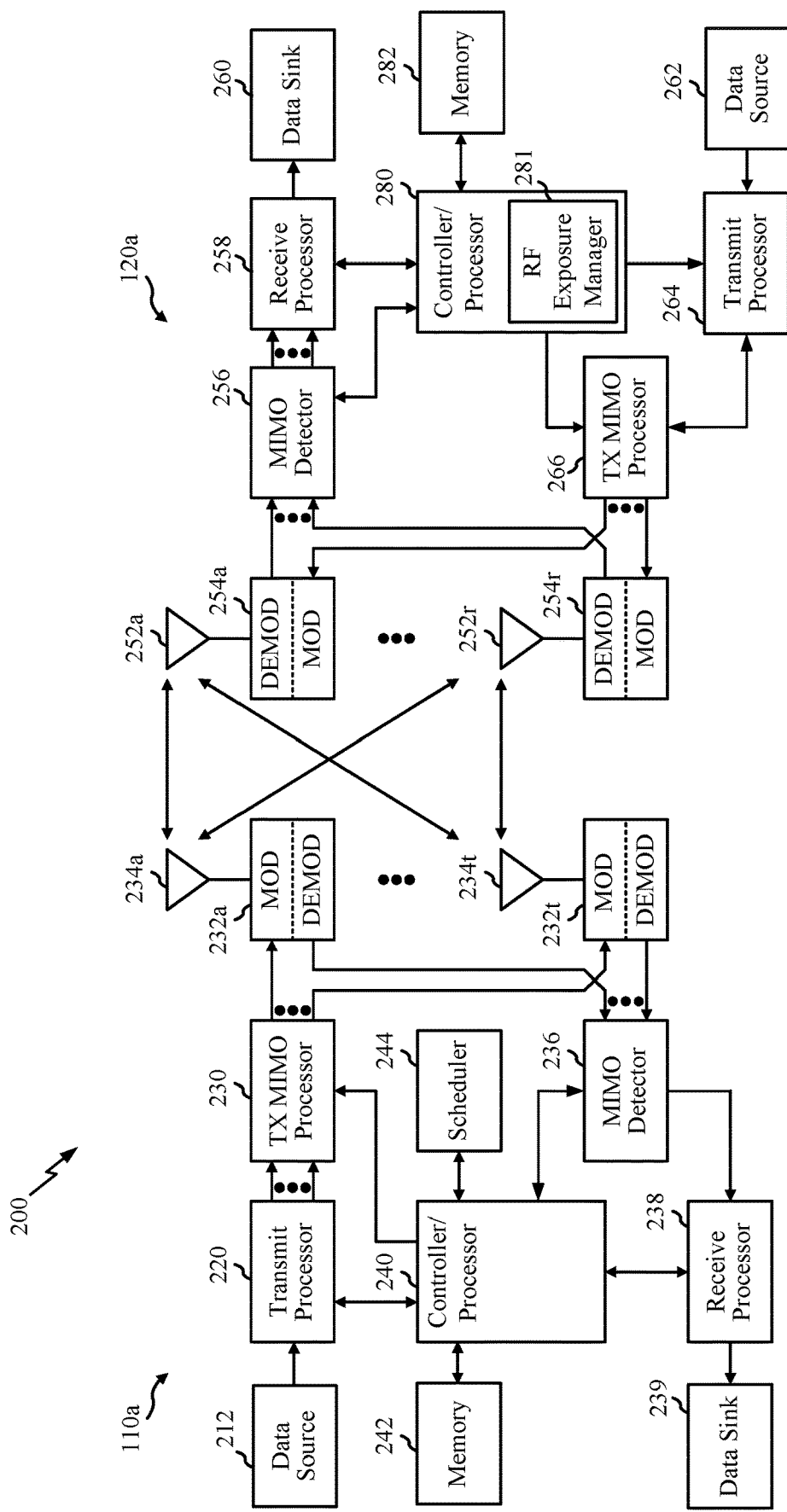
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
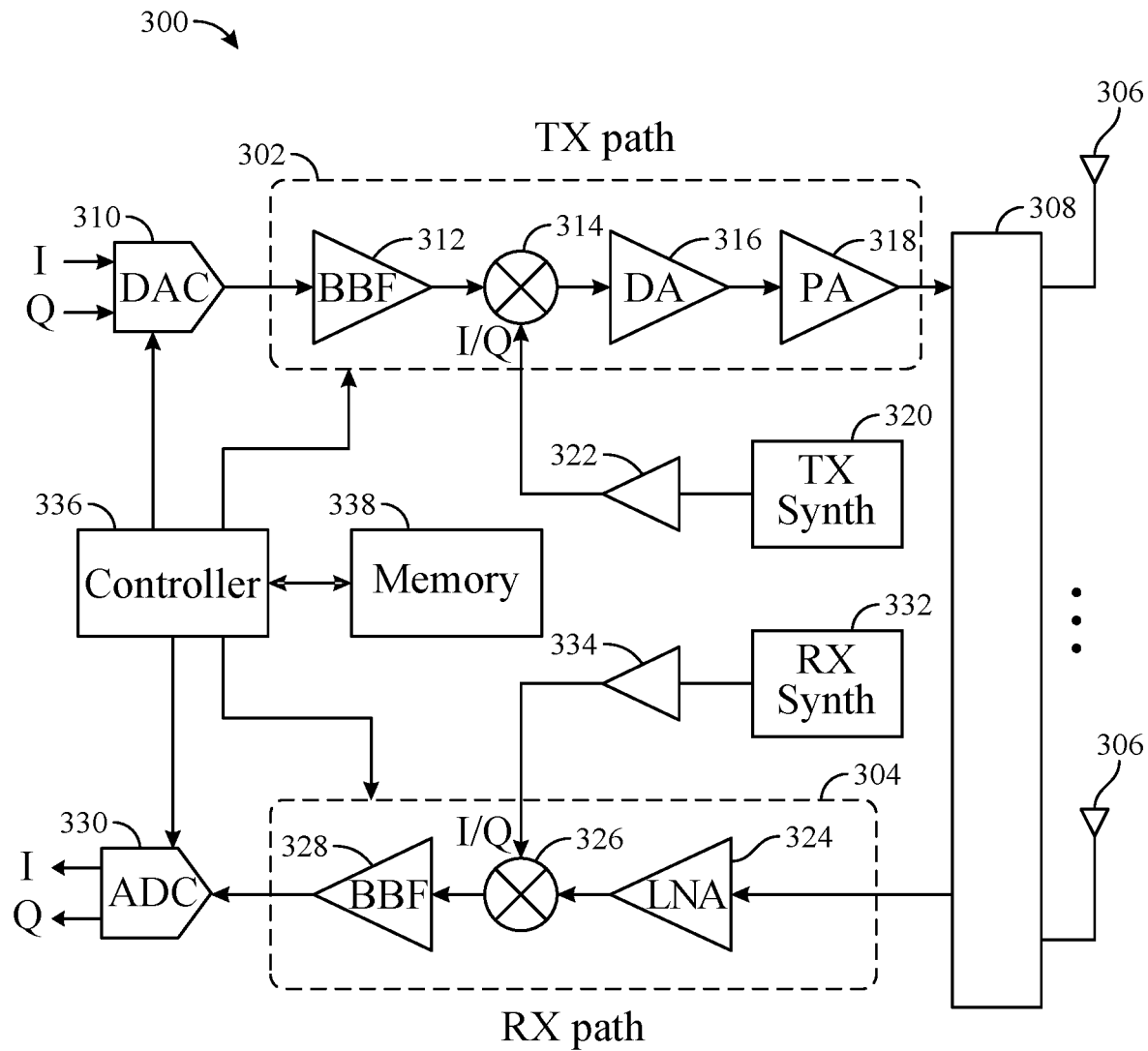
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a time-averaged RF exposure based on transmission power levels applied to the TX path 302 (e.g., certain levels of gain applied to the BBF 312, the DA 316, and/or the PA 318) to set a transmission power level that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11 (e.g., a/b/g/n/ac), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, 802.11a/b/g/n/ac, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

Figure 4A:
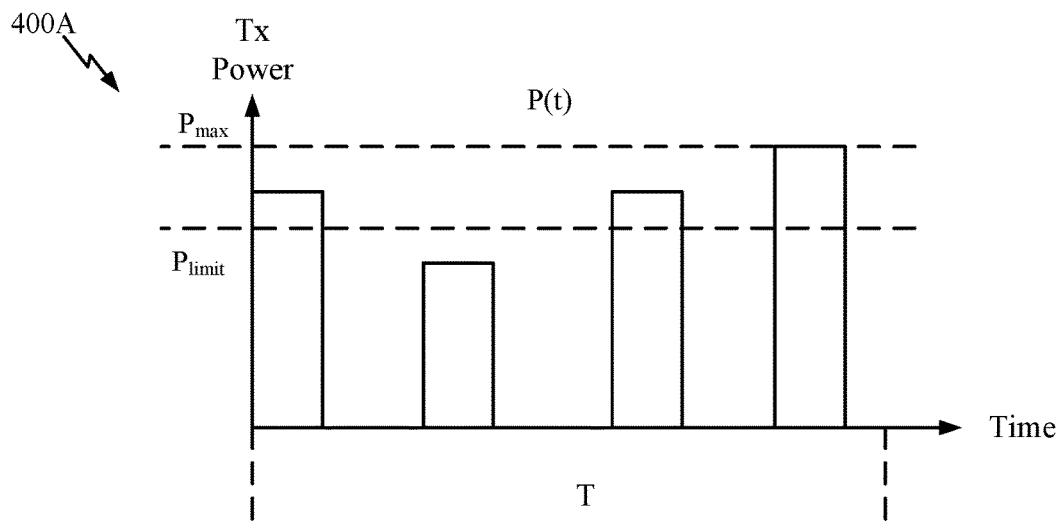
FIGS. 4A, 4B, and 4C are graphs illustrating examples of transmit powers over time in compliance with a time-averaged RF exposure limit, in accordance with certain aspects of the present disclosure.

In certain cases, compliance with an RF exposure limit may be performed as a time-averaged RF exposure evaluation within a specified running time window (T) (e.g., 2 seconds for 60 GHz bands, 100 or 360 seconds for bands less than or equal to 6 GHz, etc.) associated with the RF exposure limit. For example, FIG. 4A is a graph 400A of a transmit power over time (P(t)) that varies over the time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). In certain cases, the UE may transmit at $P_{max}$, which may be the maximum instantaneous transmit power supported by the UE or the maximum instantaneous transmit power the UE is capable of outputting. In certain cases, the UE may transmit at a transmit power less than or equal to the maximum time-averaged transmit power level $P_{limit}$ in certain transmission occasions. $P_{limit}$ represents the time-averaged level in terms of transmit power for the RF exposure limit over the time window (T), and in certain cases, $P_{limit}$ may be referred to as the maximum time-averaged power level or limit, or in terms of exposure, the maximum time-averaged RF exposure level or limit. $P_{limit}$ represents the maximum transmit power the UE can output continuously for the duration of the running time window (T) in compliance with the RF exposure limit, as further shown in FIG. 4B. The graph 400A also illustrates gaps between transmission bursts, where the gaps represent periods during which no transmission was sent from the device.

Figure 4B:
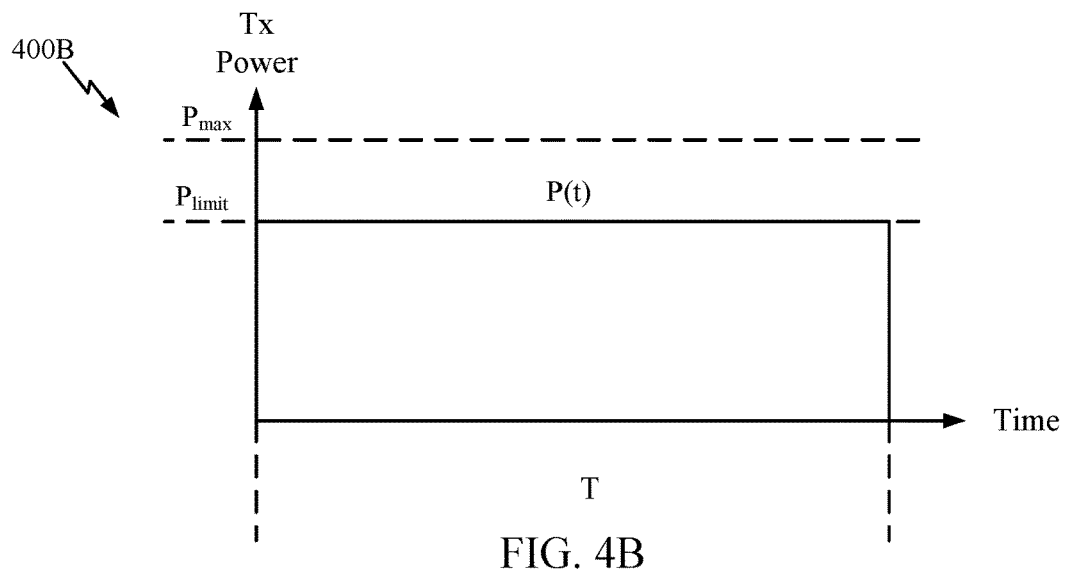

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ for the duration of the running time window (T) in compliance with the RF exposure limit.

Figure 4C:
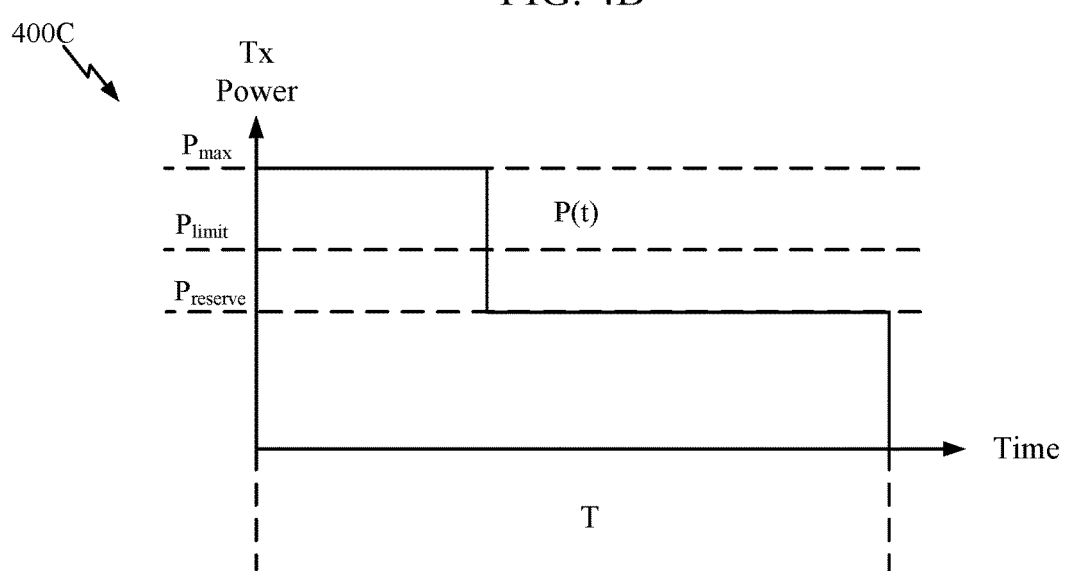

FIG. 4C is a graph 400C of a transmit power over time (P(t)) illustrating a time-average mode that provides a reserve power to enable a continuous transmission within the time window (T), in accordance with certain aspects of the present disclosure. As shown, the transmit power may be backed off from the maximum instantaneous power ($P_{max}$) to a reserve power ($P_{reserve}$) so that the UE can continue transmitting at the lower power ($P_{reserve}$) to maintain a continuous transmission during the time window (e.g., maintain a radio connection with a receiving entity). In FIG. 4C, the area between $P_{max}$ and $P_{reserve}$ for the time duration of $P_{max}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications) or at such fixed power plus a margin, as further described herein. The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-average mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission(s) may be implemented. For example, a transmit power may be zero periodically and maintained at a higher level (e.g., a level as illustrated in FIGS. 4A-4C) during other portions of the time period associated with the duty cycle. In some cases, the wireless device may transmit in bursts, for example, as depicted in FIG. 4A, and the wireless device may have an equivalent duty cycle over the time period associated with the duty cycle. As used herein, the duty cycle for transmission(s) may refer to a portion (e.g., 5 ms) of a specific time period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior. As an example, certain RATs may specify the uplink duty cycle in the form of a time division duplexing (TDD) configuration, such as a TDD uplink-downlink slot pattern in 5G NR or similar TDD patterns in E-UTRA or UMTS.

Example Energy Allocation Among Multiple Radios for RF Exposure Compliance

Multi-mode/multi-band wireless communication devices have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless communication device may limit maximum transmit power for both sub-6 GHz bands and bands greater than 6 GHz.

In certain cases, a wireless communication device may track the RF exposure per active radio (e.g., a first radio for LTE, a second radio for NR, a third radio for Bluetooth, etc.) over time for time-averaged RF exposure compliance. The total available energy for RF exposure compliance may be allocated among active radios. For example, in a two-radio scenario, a first radio may be allocated x percentage (x %) of the total energy, and a second radio may be allocated the remainder of the total energy (e.g., 100%–x %). Such an approach for allocating the energy among the radios may be efficient when each of the radios fully uses the respective share of allocated energy. For example, if one of the radios does not consume all of the allocated energy for a given time window associated with an RF exposure limit, the wireless communication device may be wasting energy that could be allocated to another radio.

Aspects of the present disclosure provide apparatus and methods for allocating energy among multiple radios for RF exposure compliance. For example, certain reserve levels of exposure (or energy or transmit power) may be allocated to the radios to facilitate each radio's wireless communication link with other wireless devices, where the reserve levels may be determined based on certain criteria (e.g., network/radio conditions, transmission duty cycle, and/or application demands) associated with each radio.

The apparatus and methods for allocating energy described herein may facilitate improved wireless communication performance, such as reduced latencies, increased data rates, improved signal qualities, and/or enhanced communication range (e.g., transmissions at a cell's edge). For example, certain efficiencies related to the energy allocation can be improved by tracking the total past RF exposure using a unified set of time windows, and any unused margin by an active radio in the total past RF exposure can be recovered or used by the other radios.

Figure 5A:
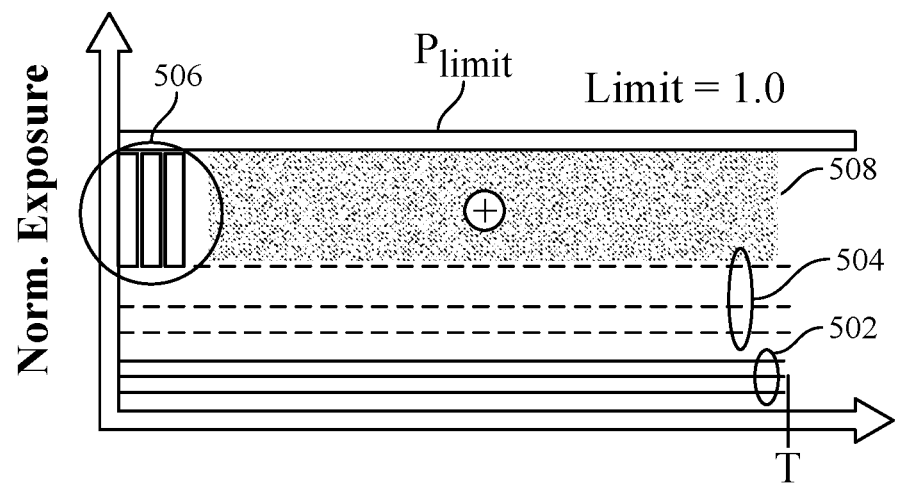
FIG. 5A is a graph of example reserves allocated for certain radios with respect to a normalized exposure over time, in accordance with certain aspects of the present disclosure.

FIG. 5A is a graph 500A of example reserves allocated for certain radios with respect to a normalized exposure (e.g., transmit power over $P_{limit}$) over time, in accordance with certain aspects of the present disclosure. Since $P_{limit}$ may vary, for example, with RAT, band, antenna, transceiver, and/or an exposure scenario (e.g., a device state index (DSI)) for a given radio, transmit powers of a given radio may be normalized with the corresponding $P_{limit}$ to obtain a normalized exposure, such that the normalized exposure for all radios when averaged over the time window T comply with the time-averaged RF exposure limit (e.g., the average transmit power over the time window is less than $P_{limit}$). The normalized exposures for multiple radios may be tracked over time and stored to determine the future exposure/energy allocation for each active radio in compliance with the time-averaged RF exposure limit.

In this example, a base reserve 502 may be allocated for each of the radios (e.g., transceivers) of a wireless device or some of the radios. The base reserve may be allocated for a particular radio even if the radio is turned off. In certain cases, the base reserve may guarantee a certain transmit power within a time window for the radio when the radio turns on (e.g., when the radio has paused transmitting and resumes transmitting or when the radio is initialized for transmissions). The base reserve may be (or correspond to) a guaranteed reserve of transmit power (or exposure), which spans over the full duration of a time window (T) associated with a time-averaged RF exposure limit (e.g., $P_{limit}$ which may be representative of a normalized maximum time-averaged RF exposure limit equal to 1). The base reserve may be set to a minimum value to facilitate wireless communications regardless of whether the respective radio is operating (e.g., active or inactive). As an example, a radio may be considered active if the radio has transmitted in the time-averaging time window or is expected to transmit in a future time interval (for example, due to the radio being scheduled to transmit or having data to transmit), whereas a radio may be considered inactive if the radio has not transmitted in the time-averaging time window or is not expected to transmit in the future time interval (for example, due to the radio operating in a low power mode). As an example, the base reserve for a radio may be set to a relatively low value under the assumption that the wireless device is in desirable radio conditions for the radio (e.g., positioned close to the cell). In certain cases, the base reserve may be a fixed value or adjusted, for example, according to radio conditions or user behavior, etc. The base reserve in terms of normalized exposure for a given radio may be representative of a base reserve transmit power normalized with respect to $P_{limit}$ of that radio.

A dynamic reserve 504 may be allocated for each of the radios or one or more of the radios (e.g., some of the radios). The dynamic reserve may include a reserve of normalized exposure (e.g., a normalized reserve transmit power to corresponding $P_{limit}$ of that radio) dynamically allocated according to one or more criteria for the respective radio. The dynamic reserve may be allocated for a full duration of the time window (T) associated with the time-averaged RF exposure limit associated with the respective radio. The dynamic reserve may be set to a value that can maintain transmission of certain signals (e.g., control signaling, certain periodic traffic, etc.). The dynamic reserve may be determined according to a function of the maximum time-averaged RF exposure limit (e.g., $P_{limit}$), radio/network conditions (e.g., path loss), and/or certain periodic traffic (e.g., control signaling and/or voice traffic). The dynamic reserve may vary with radio conditions. In certain aspects, the dynamic reserve 504 may not be guaranteed for a particular radio. For example, some radio(s) may not be allocated a dynamic reserve, or the dynamic reserve may be set to zero for some radio(s). In certain aspects, multiple dynamic reserves 504 may be allocated to at least one (or several) of the radios. For example, the multiple dynamic reserves 504 for a particular radio may be associated with different service or traffic types (e.g., control signaling or user traffic), different radio or network conditions, etc.

For certain aspects, the greatest value among the base reserve and the dynamic reserve (e.g., max(base.res, dyn.res)) for a particular radio may be used for determining the total transmit power allocation for the radio, as further described herein. The base reserve (base.res) may serve as a floor of transmit power allocated to a particular radio, and the dynamic reserve (dyn.res) may serve as a variable parameter that can raise the floor for the radio.

A buffer margin 506 may be allocated for each of the radios. The buffer margin may include a reserve of transmit power (or exposure) dynamically allocated for unexpected transmissions with the respective radio, for example. The buffer margin may be allocated for a portion of the time window (T) associated with the time-averaged RF exposure limit associated with the respective radio. Since the buffer margin when allocated to a radio may not be used by the radio and may be set aside for unexpected transmissions (for example, higher scheduling grants by a network), the buffer margin allocation may not span across a full duration of the time window. Unlike the horizontal allocations of the base reserve and the dynamic reserve that are allocated for the entire time window T, the buffer margin may be considered a vertical allocation of reserve transmit power as the buffer margin may be allocated for a portion of the time window, such as short unexpected transmissions. For example, the buffer margin may be set to a value to handle fluctuations in scheduled transmissions, which may provide desirable wireless communication performance when the buffer margin is used for such a transmission. The buffer margin may be used to reserve transmit power to handle any momentary fluctuations (e.g., events lasting over short durations (less than a RF exposure time window)) for certain periodic transmissions, such as voice traffic, which may operate at a low, predictable duty cycle. In some cases, the buffer margin may be used for high duty cycle transmissions. Since buffer margin may be set aside by the radio and may only be used for unexpected transmissions, the buffer margin may contribute towards inefficiency in normalized exposure usage, as the maximum time-averaged normalized exposure usage by all radios is equal to {100%−sum(buffer margin of all radios)} when there are no unexpected transmissions. A higher buffer margin allocation can handle larger fluctuations in radio conditions or scheduling, but the buffer margin may result in higher inefficiency in overall normalized exposure usage, when the buffer margin goes unused, for example. Allocating the buffer margin for only a small portion of the time window T (e.g., a vertical allocation) may be for efficiency and leave more margin to support high power bursts. In certain aspects, the buffer margin 506 may not be guaranteed for a particular radio. For example, a radio may not be allocated a buffer margin, or the buffer margin may be set to zero for the radio.

The dynamic reserve may be based on one or more criteria, such as estimated control channel/voice duty cycle, path loss, and/or $P_{limit}$. The buffer margin may be allocated for unexpected short duration transmissions. For example, suppose control channel and the voice duty cycles vary between 20% and 30%. The dynamic reserve may be determined using the upper bound estimate of 30% so that the dynamic reserve is sufficient for transmissions over the duration of the RF exposure time window. If suddenly, the network grants a 50% duty cycle transmission over the next 200 ms, the buffer margin may be used to compensate for the unexpected transmission. If the network continues granting at the 50% duty cycle transmission for a longer duration, the dynamic reserve may be adjusted to compensate for the change in periodic traffic. The buffer margin may serve to allocate exposure for short duration fluctuations in traffic.

The remaining margin 508 may be allocated across the radios, for example, depending on past usage and/or priorities associated with the radios. The remaining margin may be allocated across the radios using certain coefficients ($x_i$) assigned to each of the radios (e.g., $x_i$·margin, where $x_i$ is the coefficient for a radio and within [0, 1]), where the sum of the coefficients for the radios is equal to one (1). In some aspects, the remaining margin may be equal to the total margin minus the dynamic reserves, buffer margins, and past used exposure above the reserve for all the radios.

In certain aspects, the base reserve, dynamic reserve, and/or buffer margin for a particular radio may be set to zero, for example, in cases where the given reserve or margin is not used by or allocated to the radio. For example, some radios will not use a base reserve and will thus have a base reserve of zero. Expressed another way, a nonzero base reserve 502 may be allocated for one or more of the radios. The base reserve, dynamic reserve, and/or buffer margin may be reserved transmit powers (or energy) normalized to corresponding time-averaged RF exposure limit $P_{limit}$ of the radio.

For certain aspects, a particular radio (e.g., a radio for Bluetooth transmissions) may be allocated a value for the base reserve that is greater than zero, and the other radios (e.g., CDMA, LTE, NR, 802.11, etc.) may be allocated values for the respective dynamic reserve that is greater than the base reserve for the respective radio. For example, in such a scenario, the Bluetooth radio may be the only radio assigned a base reserve (assuming the dynamic reserves are used for the other radios) to allow for transmissions by the Bluetooth radio at any given moment due to the intermittent usage of Bluetooth communications.

Figure 5B:
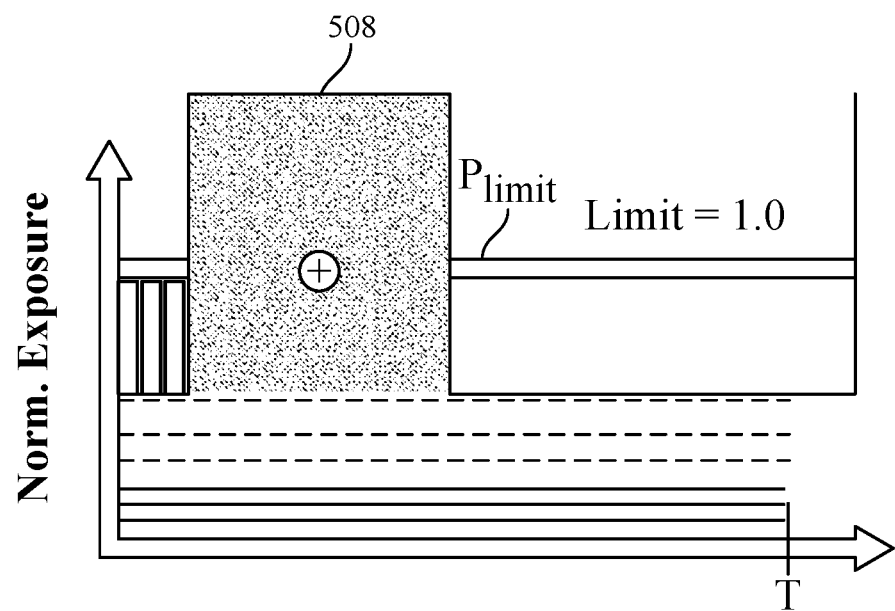
FIG. 5B is a graph of an example of normalized exposure over time for all of the radios of a wireless device, in accordance with certain aspects of the present disclosure.

FIG. 5B is a graph 500B of an example of normalized exposure over time for the radios of a wireless device, in accordance with certain aspects of the present disclosure. In this example, the wireless device may allocate the various reserves and margins as described herein, and the remaining margin 508 may be concentrated (when compared to FIG. 5A), e.g., total normalized exposure exceeds 1.0 for a short duration T). The reserves and margins may facilitate the wireless device to use the available exposure (e.g., remaining margin 508) above the time-averaged RF exposure limit, for example, as described herein with respect to FIGS. 4A-4C.

Figure 6:
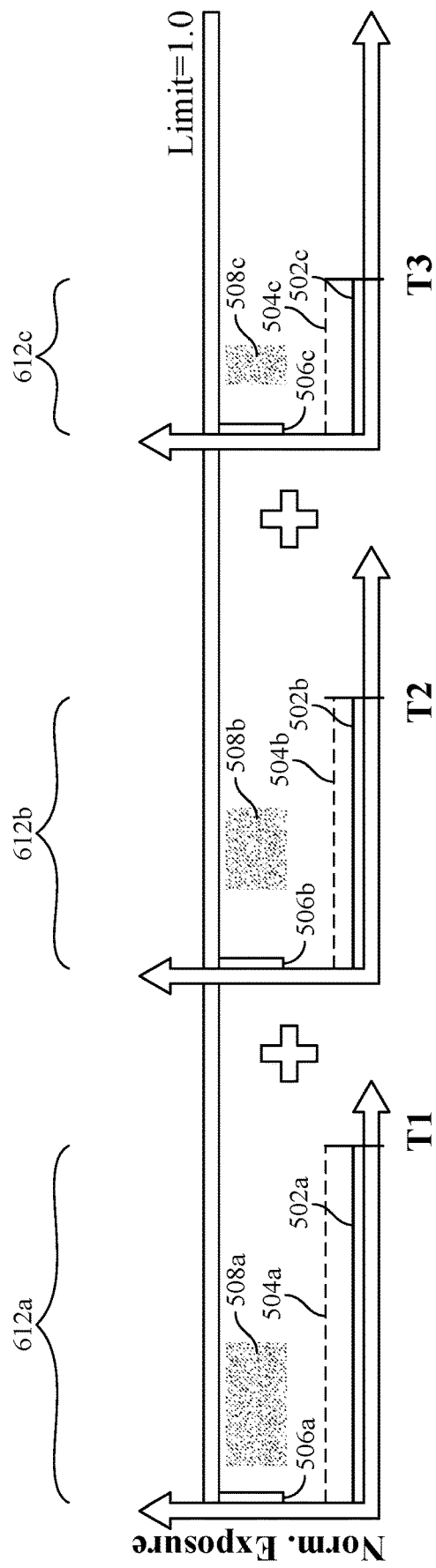
FIG. 6 is a diagram of an example allocation of reserves and margins across multiple radios, in accordance with certain aspects of the present disclosure.

FIG. 6 is a diagram of an example allocation of reserves (base reserves and dynamic reserves) and margins (buffer margins and remaining margins) across multiple radios in multiple time windows (T1, T2, and T3), in accordance with certain aspects of the present disclosure. In this example, each of the allocations 612a, 612b, 612c is an example of an energy allocation for a different radio(s) in each time window, where a sum of the allocations 612a, 612b, 612c represents the total energy allocation for a wireless device. The total energy will satisfy the time-averaged RF exposure limits for each of the radios, such that the sum of the allocations 612a, 612b, 612c will be less than or equal to a normalized time-averaged RF exposure limit having a value of one. The first allocation 612a includes base reserve(s) 502a, dynamic reserve(s) 504a, buffer margin(s) 506a, and/or a portion of the remaining margin 508a corresponding to all the radio(s) transmitting in time window T1; and so on for the other allocations 612b, 612c. It will be appreciated that the remaining margins 508a-c may occupy more or less of the area under $P_{limit}$ for the respective time windows depending on the allocations of base reserves, dynamic reserves, and buffer margins, for example, as depicted in FIG. 5A. Each of the radios may use different time windows (T1, T2, and T3) for the respective normalized time-averaged RF exposure limit (e.g., normalized to $P_{limit}$). For example, T1 may be 100 seconds for radio(s) transmitting in frequency bands less than 3 GHz; T2 may be 60 seconds for radio(s) transmitting in frequency bands between 3 GHz and 6 GHz; and T3 may be 4 seconds for radios transmitting in mmWave bands between 24 GHz and 42 GHz. In certain aspects, the respective reserves and margins for the radios may be converted to a different time window, for example, in response to a time window transition.

Figure 7:
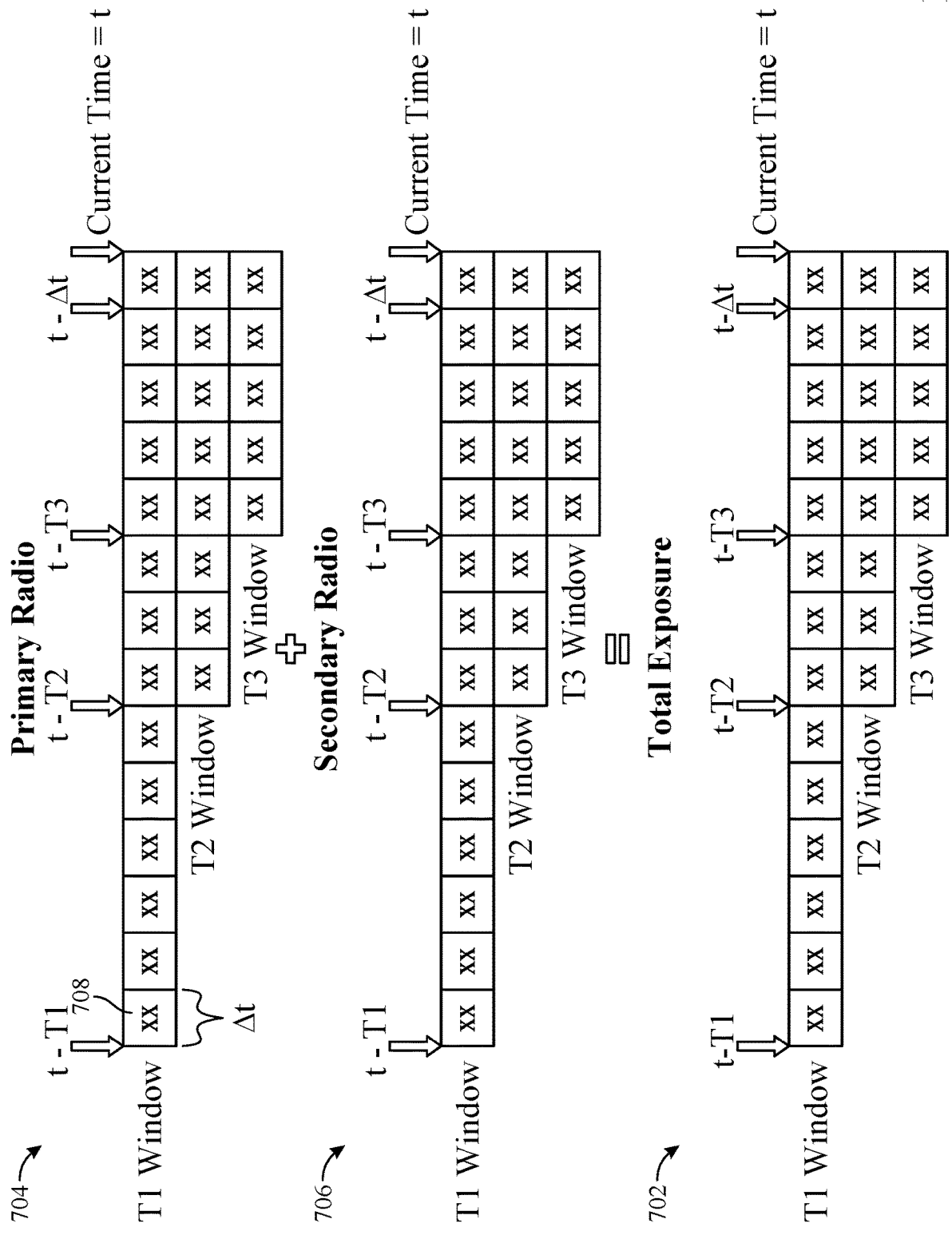
FIG. 7 is a diagram of example radio exposures forming a total exposure for a wireless device, in accordance with certain aspects of the present disclosure.

FIG. 7 is a diagram of example radio exposures forming a total exposure for a wireless device, in accordance with certain aspects of the present disclosure. In this example, a total past RF exposure 702 may be calculated from a first RF exposure history 704 associated with a primary radio and a second RF exposure history 706 associated with a secondary radio. For example, the total past RF exposure 702 may be calculated as a sum of the first RF exposure history 704 and the second RF exposure history 706. The total past RF exposure 702 may represent the sum of normalized RF exposures associated with the first RF exposure history 704 and the second RF exposure history 706. The total past RF exposure 702 may be a normalized value of RF exposure, as further described herein. Transmissions of the primary radio and/or second radio may be associated with different time windows (T1, T2, and T3) that are each associated with time-averaged RF exposure limits, for example, for different frequency bands. The first RF exposure history 704 (along with the second RF exposure history 706 and the total past RF exposure 702) may have RF exposure values 708 (or corresponding transmit power values) per time interval (Δt) across each of the time windows (T1, T2, and T3). The RF exposure values per time interval (Δt) associated with the first time window (T1) may span the duration of T1 from (t−T1) to the current time (t), and so on for the second and third time windows (T2 and T3). The total past RF exposure 702 may be used to determine how to adjust the dynamic reserve, buffer margin, and/or any remaining reserve for one or more radios, for example, in cases where another radio may have unused reserves and/or margins, based on one or more such time windows, as described in further detail herein.

Figure 8:
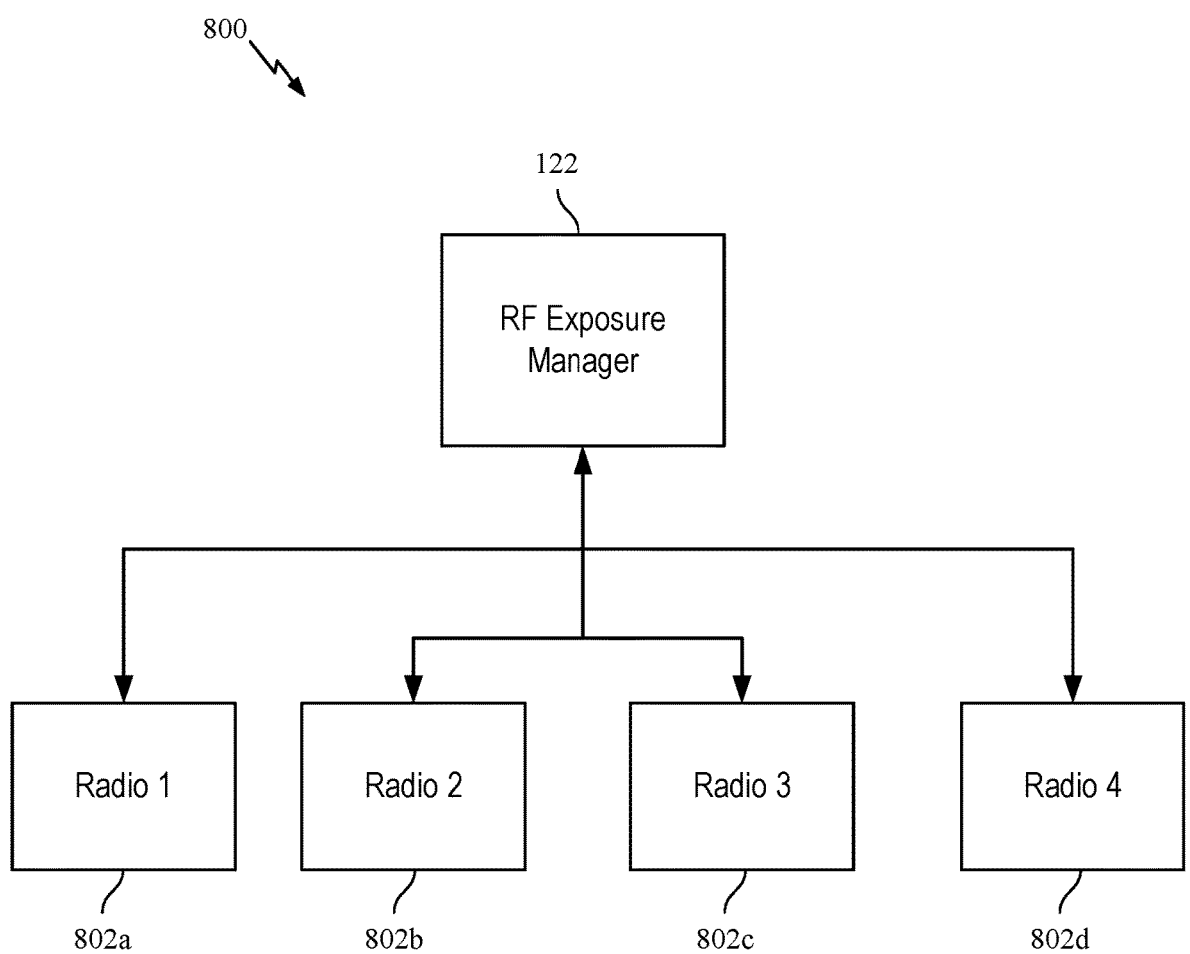
FIG. 8 is a diagram of an example processing architecture for allocating the energy across the radios, in accordance with certain aspects of the present disclosure.

For certain aspects, the energy allocation may be performed using a centralized processing architecture. FIG. 8 is a diagram of an example processing architecture 800 for allocating the energy across multiple radios, in accordance with certain aspects of the present disclosure. For example, the radios 802a-d (collectively radios 802) (e.g., Radio 1, Radio 2, etc.) of a wireless device (e.g., the UE 120a) may request certain values for the reserves and/or margins from a central algorithm or controller, such as the RF exposure manager 122. Each radio 802 may provide the requested values for the reserves and/or margins on a periodic basis and/or in response to certain event(s). The RF exposure manager 122 may determine the reserves and/or margins for each of the radios 802, for example, based on the requested values from the individual radios. As an example, the RF exposure manager 122 may use the requested values as initial values for determining the reserves and margins for the respective radios and adjust the values as further described herein. The RF exposure manager 122 may provide, to each (or some) of the radios 802, the total allowed energy allocation (e.g., the allocations 612a, 612b, 612c) for a corresponding time window and/or values determined for the reserves and margins. The RF exposure manager 122 may provide, to each (or some) of the radios 802, the energy allocations on a periodic basis and/or in response to certain event(s).

Each of the radios 802 may operate using a separate RF exposure compliance algorithm, for example, according to a time-averaged RF exposure limit, a fixed RF exposure limit, etc. For example, the first radio 802a (Radio 1) may operate using a time-averaged RF exposure limit in determining transmit powers in compliance with the RF exposure limit, where the first radio 802a (Radio 1) may operate according to any of the examples described herein with respect to FIGS. 4A-4C. The second radio 802b (Radio 2) may operate using a fixed RF exposure limit, where the second radio 802b (Radio 2) only allows transmit powers less than or equal to a fixed transmit power limit, such as $P_{limit}$.

In some examples, the RF exposure manager 122 may provide to one or more of the radios 802 an energy allocation (e.g., total energy allocation, energy allocation of just a margin, etc.), or the one or more radios 802 may convert information received from the RF exposure manager 122 to an allowed or allocated energy. Each of the one or more radios 802 may transmit within a time window until that energy is consumed. Further, each of the one or more radios 802 may convert the energy to a power (e.g., a $P_{limit}$) and transmit accordingly.

In some examples, the RF exposure manager 122 may provide to one or more of the radios 802 a power (e.g., a $P_{limit}$), or the one or more radios 802 may convert information received from the RF exposure manager 122 to determine a maximum or average allowed power (e.g., $P_{limit}$). As described above, each of the one or more radios 802 may operate such that an average transmit power within a time window is less than or equal to the provided or determined power. Further, each of the one or more radios 802 may always transmit at the power, or at levels at or below the power.

Other examples of constraints or information that may be provided to one or more radios 802 from the RF exposure manager 122 may include another representation of margin available or assigned to a certain radio (e.g., the first radio 802*a*), normalized exposure available or assigned to a certain radio (e.g., the first radio 802*a*), etc. Each of the radios 802 receiving this information may transmit based on the constraint, as described herein.

In some examples, each (or some) of the radios 802 may transmit independent of any other radio based on information received from the RF exposure manager 122 and/or independent of the RF exposure manager 122 in respects other than the received constraints and/or reserve(s). For example, as alluded to above, one or more radios 802 may determine to transmit using one or more bursts (e.g., at $P_{max}$) above a respective $P_{limit}$ such that the average transmit power over a time window is less than the respective $P_{limit}$. In some examples, one or more radios 802 may determine on which channels to transmit, and the respective radio 802 may prioritize certain channels over another. As another example, one or more radios 802 may determine which communications to send or to prioritize, and or how to manage communications for a plurality of applications or services. Such determinations may further be based on DSI, mobile network code (MNC), and/or mobile country code (MCC), one or more reserves, communications from the network, etc. In some examples, a transmit power may be limited more than would be designated by exposure regulations, for example, due to hardware constraints, wireless communication standards, wireless network specifications and/or configurations, etc.

Each of the radios 802 may provide various information to the RF exposure manager 122. For example, the radios 802 may provide the current transmit power usage for a given time window (or for an interval of the time window) and/or usage of a normalized exposure (as will be described in more detail later). The current transmit power usage may be converted in terms of a normalized exposure ratio, where the conversion may be performed at the radio(s) 802 and/or the RF exposure manager 122.

As an example, the first radio 802*a* (Radio 1) may request certain values for its reserve and/or margin from the RF exposure manager 122. The RF exposure manager 122 may determine the reserve and/or the margin for the first radio 802*a* (Radio 1) based at least in part on the requested values. In certain aspects, the RF exposure manager 122 may consider priorities and past usage of normalized exposure (for example, as described herein with respect to FIG. 7) in determining the reserve and/or the margin for the first radio 802*a* (Radio 1). The first radio 802*a* (Radio 1) may obtain the total allowed energy allocation from the RF exposure manager 122, where the energy allocation may include a base reserve, dynamic reserve, buffer margin, and/or a portion of the remaining margin, for example, as described herein with respect to FIG. 6. The first radio 802*a* (Radio 1) may transmit a signal in a time interval at a transmit power determined based at least in part on the reserve, margin, and/or total allowed energy allocation as described herein. Thereafter, the first radio 802*a* (Radio 1) may report back to the RF exposure manager 122 the transmitted power, energy consumed, and/or normalized exposure, etc., used for the time interval. In other examples, the first radio 802*a* (Radio 1) may send back to the RF exposure manager 122 whether all of the allowed energy, power, etc. obtained from the RF exposure manager 122 was used/consumed and/or an indication of how much more or less energy, etc. was used by Radio 1. Such communications back to the RF exposure manager 122 may be executed on a periodic basis (e.g., every time interval (Δt) in FIG. 7 or as described with respect to subsequent figures, after each time window, etc.) and/or in response to certain event(s) (e.g., when the amount of energy used or the pattern of energy used departs from past usage). Further, such communications back to the RF exposure manager 122 may affect how the RF exposure manager 122 assigns energy, power, etc. to one or more of the radios 802 during future operation.

It should be appreciated that the RF exposure manager 122 and/or radios 802 depicted in the processing architecture 800 may be implemented in hardware, software, or a combination of both. For example, the RF exposure manager 122 and/or radios 802 included in the processing architecture 800 may be implemented in a modem, an RF circuit (e.g., a transceiver), memory blocks, registers, processing blocks, and/or in instructions (e.g., software code or executable instructions). The executable instructions may be stored in memory and executed on a processor (e.g., an application processor and/or modem processor).

Figure 9:
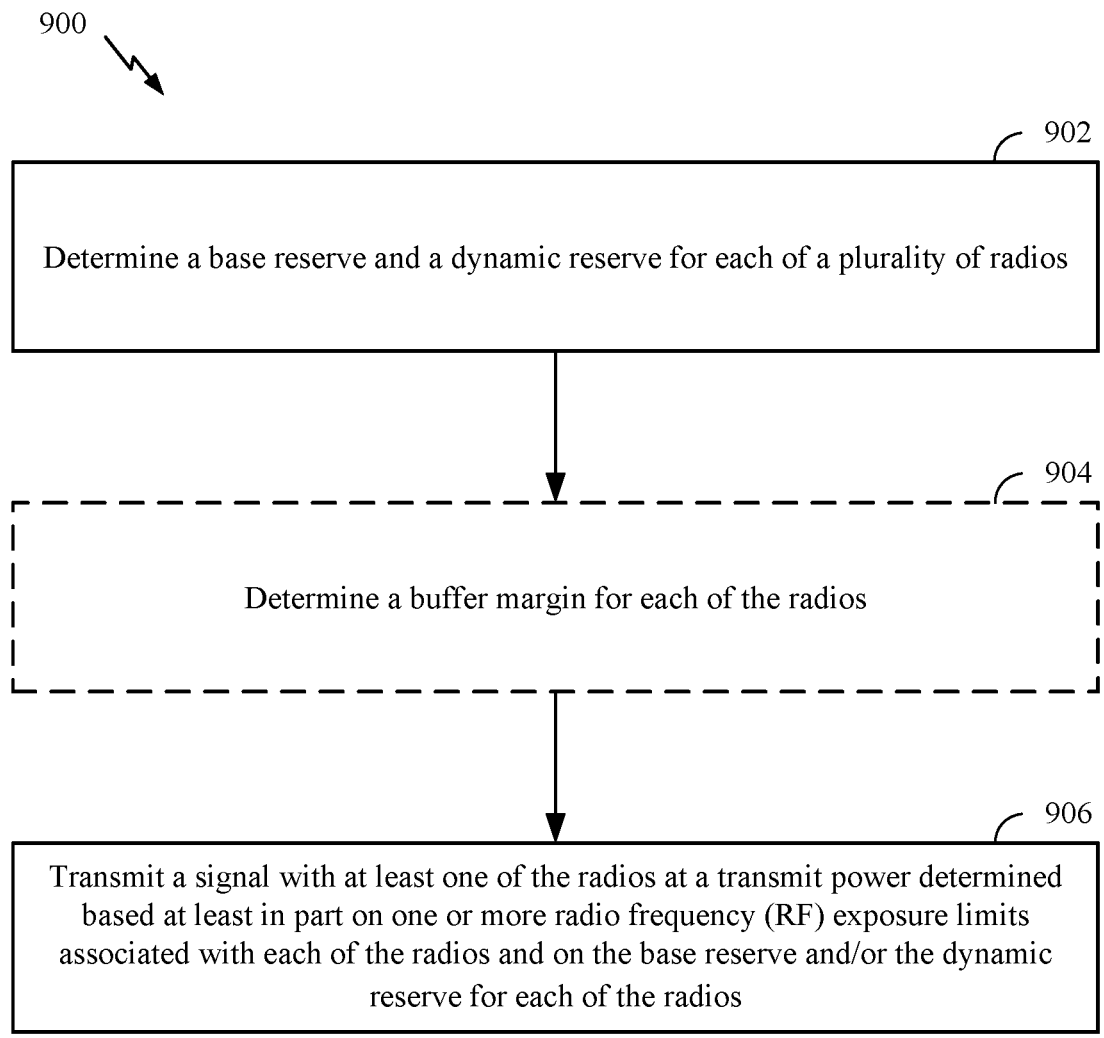
FIG. 9 is a flow diagram illustrating example operations for wireless communication by a wireless device, in accordance with certain aspects of the present disclosure.

FIG. 9 is a flow diagram illustrating example operations 900 for wireless communication, in accordance with certain aspects of the present disclosure. The operations 900 may be performed, for example, by a wireless device (e.g., the UE 120*a* in the wireless communication network 100). The operations 900 may be implemented as software components that are executed and run on one or more processors (e.g., controller/processor 280 of FIG. 2). Further, the transmission and/or reception of signals by the UE in the operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may optionally begin, at block 902, where the wireless device may determine a base reserve (e.g., the base reserve 502) and a dynamic reserve (e.g., the dynamic reserve 504) for each of a plurality of radios (e.g., the radios 802). For example, the wireless device may determine the base reserve and dynamic reserve as described herein with respect to FIGS. 5A and 6. The base reserve may be preset, and to determine the base reserve, the wireless device may identify the preset value associated with the base reserve. In some cases, the base reserve may be calculated, configured, selected, etc. in real-time (e.g., periodically) or in response to one or more events (e.g., a change in the number of active radios, network/channel conditions, etc.).

Optionally, at block 904, the wireless device may determine a buffer margin (e.g., the buffer margin 506) for each of the radios. The wireless device may determine the respective buffer margin in addition to the base reserve and the dynamic reserve.

At block 906, the wireless device may transmit a signal with at least one of the radios (e.g., the first radio 802*a*) at a transmit power determined based at least in part on one or more maximum time-averaged RF exposure limits (e.g., the different time-averaged RF exposure limits depicted in FIG. 6) associated with each of the radios and on the base reserve and/or the dynamic reserve for each of the radios. As an example, the wireless device may transmit a control signal and/or data signal to another wireless device (e.g., a base station or a UE). In cases where the buffer margin is used, the wireless device may transmit the signal with at least one of the radios at the transmit power determined based at least in part on the RF exposure limits associated with each of the radios and on the base reserve, the dynamic reserve, and the buffer margin for each of the radios. In certain aspects, the wireless device may transmit the signal with at least one of the radios at the transmit power determined based at least in part on a summation of the dynamic reserve for each of the radios.

The base reserve for each of the radios may be a guaranteed reserve of transmit power (or exposure) for the respective radio regardless of whether the respective radio is operating, for example, as described herein with respect to FIG. 5A. The base reserve for each of the radios may be allocated for a full duration of a time window (e.g., T of FIG. 5A) associated with the RF exposure limit associated with the respective radio.

The dynamic reserve for each of the radios may include a reserve of transmit power (or exposure) dynamically allocated according to one or more criteria for the respective radio, for example, as described herein with respect to FIG. 5A. The criteria may include one or more radio conditions associated with the respective radio, one or more duty cycles for transmissions associated with the respective radio, or a combination thereof. The radio conditions may include the channel quality between the wireless device and a receiving entity (e.g., the BS 110), the path loss between the wireless device and the receiving entity, the modulation and coding scheme (MCS), the coding rate (e.g., the proportion of the data-stream that is non-redundant), the number of aggregated component carriers, the number of MIMO layers, the bandwidth, the subcarrier spacing, the frequency range (e.g., frequency range 1 (FR1) or frequency range 2 (FR2) under 5G NR), etc. A property indicative of the channel quality may include, for example, a path loss, a channel quality indicator, a signal-to-noise ratio (SNR), a signal-to-interference plus noise ratio (SINR), a signal-to-noise-plus-distortion ratio (SNDR), a received signal strength indicator (RSSI), a reference signal received power (RSRP), a reference signal received quality (RSRQ), and/or a block error rate (BLER).

The duty cycle(s) used to determine the dynamic reserve may include a first duty cycle for control signaling (e.g., uplink control information) and/or a second duty cycle for user traffic. The user traffic may include voice traffic and/or other periodic user traffic, such as traffic for a video call, video streaming, online gaming, social media, multimedia messaging, etc.

The buffer margin for each of the radios may include a reserve of transmit power (or exposure) dynamically allocated for unexpected transmissions with the respective radio, for example, as described herein with respect to FIG. 5A. The buffer margin for each of the radios may be allocated for a portion of a time window associated with the (time-averaged) RF exposure limit associated with the respective radio.

For certain aspects, the determination of the base reserve, dynamic reserve, and/or buffer margin for each of the radios may depend on certain criteria. In certain aspects, the base reserves may be initially allocated to the radios, and then, the dynamic reserves and/or buffer margins may be allocated, adjusted, and/or updated, for example, on a periodic basis or in response to a certain event.

The wireless device may prioritize the allocation of the dynamic reserve and/or buffer margin for one or more radios over other radios. If there is not sufficient margin remaining after allocating the dynamic reserve and/or buffer margin, the dynamic reserve and/or buffer margin may be allocated based on priorities associated with the radios. For example, the dynamic reserve may be fully allocated to high priority radio(s), whereas the dynamic reserve may be partially allocated or not allocated (e.g., set to zero) for low priority radio(s).

In certain cases, the allocation of the buffer margin may depend on completing the allocation of the dynamic reserve. For example, a sum of the dynamic reserves may be evaluated with respect to a normalized time-averaged RF exposure limit. If there is not sufficient margin, the dynamic reserves may be adjusted as described herein. With the remaining margin after allocating the dynamic reserves, the buffer margins may be allocated to the radios.

In certain aspects, the allocation of the dynamic reserve and/or buffer margin may depend on one or more criteria, such as the transmission history, radio conditions, duty cycle, and/or other criteria. For example, if a first radio is turned off or in a low power state and a second radio of higher priority is now operating, the dynamic reserve and/or buffer margin allocated previously to the first radio can now be allocated to the active second radio. In certain aspects, the buffer margin of a radio may get allocated over the dynamic reserve. As an example, if the first radio was allocated dynamic reserve and buffer margin in the past, and if the second radio requests a higher dynamic reserve than a previously used dynamic reserve of first radio and the second radio also requests buffer margin, the second radio may not be allocated the full requested dynamic reserve, but gets buffer margin allocated equal to the buffer margin of first radio. In certain aspects, the buffer margin of a radio may not get allocated over the dynamic reserve. In the same example, since the second radio requests a higher dynamic reserve, to satisfy this request, the centralized processing architecture may allocate the first radio's dynamic reserve and buffer margin towards satisfying the second radio's higher dynamic reserve as much as possible, and not allocate any buffer margin to the second radio.

The wireless device may determine a maximum reserve for each of the radios as a greatest value among the base reserve and the dynamic reserve for the respective radio (e.g., max(base.res, dyn.res)). The wireless device may adjust at least one of the dynamic reserve or the buffer margin for one or more of the radios such that the sum of the maximum reserve for each of the radios, the buffer margin for each of the radios, and the total past used exposure above the reserves (e.g., a portion or all of the remaining margin 508 already used in the past) is less than or equal to 1.0 (normalized maximum time-averaged RF exposure limit). The total past used exposure above the reserves may refer to a past exposure usage (e.g., the total exposure usage as described herein with respect to FIG. 7) above a past margin (e.g., a past total reserve allocated to the radios). If there is a portion of remaining margin 508 unused, then that portion of the remaining margin 508 can be further allocated across the radios, as described herein. In certain cases, all of the remaining margin 508 may be used, if the sum of maximum reserve and the buffer margin and the total past used exposure above the reserves exceeds 1.0, then, one or more of the radios may not get all of the requested dynamic reserve or the buffer margin to remain RF exposure compliant. In such cases, the wireless device may adjust at least one of the dynamic reserve or the buffer margin for each of the radios based on priorities associated with the radios, for example, as described herein.

If there is margin remaining after the allocation of the dynamic reserve and/or buffer margin and the total past used margin above reserve, the wireless device may allocate a portion of the remaining margin to the radios, for example, based on coefficients associated with the radios. The wireless device may determine a first margin based at least in part on the base reserve, the dynamic reserve exposure, and the buffer margin for each of the radios. The first margin may be the total remaining margin (e.g., the remaining margin 508), which may be a difference of a normalized maximum time-averaged RF exposure limit (=1.0) and a sum of the maximum reserve (e.g., max(base.res, dyn.res)) for each of the radios, the buffer margin for each of the radios, and the total past used margin above reserve for each of the radios.

The wireless device may allocate a second margin to each of the radios based on the first margin. The second margin may include a radio-specific margin, such as the buffer margin, dynamic reserve, and/or the portion of the first margin based on coefficients associated with the radios, for example, as described herein with respect to FIG. 5A. The wireless device may determine the transmit power based at least in part on the maximum time-averaged RF exposure limits ($P_{limit}$) and the second margin for each of the radios, where the second margin is based on the base reserve, the dynamic reserve, the buffer margin, and the portion of the first margin for each of the radios. In certain cases, the wireless device may determine the first margin based on a total past RF exposure (for example, as described herein with respect to FIG. 7) associated with the radios. For example, if there was unused reserve or margin allocated to a first radio, then past RF exposure of a second radio in the same time window as the first radio could appear to use the unused reserve or margin of first radio as the total past RF exposure (for example, as described herein with respect to FIG. 7) would appear to be using the total reserve (sum of reserves allocated to the first and second radio). The unused reserve and/or margins of one or more radios might get used by one or more other radios operating in the same time window as only the total past RF exposure is tracked, which does not distinguish individual radio usages in this example. Therefore, it may be viewed as though the wireless device is reallocating the unused reserves and/or margins to one or more other radios within the same time window. An advantage of using the total exposure in evaluating unused reserves/margin allocations is that total exposure may improve the overall efficiency of allocating reserves/margins to the radios.

In aspects, the allowed margin for a particular radio (second.margin$_i$) may be determined according to the following expression:

$$\text{second.margin}_i = \max(\text{base.res}_i, \text{dyn.res}_i) + \text{buffer}_i + x_i \cdot \text{first.margin} \quad (1)$$

where second.margin$_i$ is the total allowed normalized exposure margin for the $i^{th}$ radio; base.res$_i$ is the base reserve for the $i^{th}$ radio; dyn.res$_i$ is the dynamic reserve for the $i^{th}$ radio; buffer$_i$ is the buffer margin for the $i^{th}$ radio; $x_i$ is the corresponding coefficient for the $i^{th}$ radio; and first.margin is the total remaining margin 508 for all radios after accounting for the total past used margin above reserve for all the radios. The buffer margin may be used in certain scenarios such as to handle fluctuations in network scheduling.

FIG. 7 illustrates the history of the total past RF exposure 702 corresponding to the transmitted power normalized to $P_{limit}$. Each radio gets allocated second.margin$_i$. Each radio can transmit up to (second.margin$_i$*$P_{limit}$) power in the future $\Delta t$ time interval. Based on the transmitted power, the normalized exposure report (Norm.exposure.report$_i$) consumed by each radio is computed, as given by:

$$\text{Norm.exposure.report}_i = \min(\text{second.margin}_i * P_{limit}, \text{actual transmitted power})$$

That is, the normalized exposure report for a particular radio (e.g., the $i^{th}$ radio) may be equal to the smallest value among the actual transmitted power in the time interval and the product of the second.margin$_i$ and $P_{limit}$.

The total past RF exposure 702 depicted in FIG. 7 is an example of the total norm.exposure.reports of all radios for each $\Delta t$ for all the time windows. Due to the rolling time window analysis for the RF exposure limit, a new $\Delta t$ exposure is observed in the total exposure as an old $\Delta t$ exposure rolls out of the time windows. In certain cases, a radio may have a low margin allocation, for example, second.margin$_i$=max(base.res$_i$, dyn.res$_i$), where the radio may use all of the allocated margin. In some scenarios, a radio may be allocated a large amount of margin, but not use the full allocation (e.g., the actual transmitted power may be much lower than the allocated margin), for example, due to a change in user behavior or radio conditions. As the actual transmit power may not exceed the margin allocation, the total past RF exposure 702 depicted in FIG. 7 may be assumed to include the reserves. In case of multiple transmitting radios, the total past exposure may be stored at each $\Delta t$ interval, such that unused margin of one radio can get masked by usage of other radios, which may improve the efficiency of the algorithm.

Under the assumption that the total past exposure includes the reserves, and with the requested reserves and buffer margins for all the radios, the wireless device may calculate the total past exposure used above the reserves for all radios. The total past exposure used above the reserves for all radios (past.margin) may be determined according to the following:

$$\text{past.margin} = \text{norm.exposure.reports} - \text{sum}(\max(\text{base.res}_i, \text{dyn.res}_i)) \text{ for all radios} - \text{sum}(\text{buffer}_i * \Delta t / T(K_i)) \text{ for all radios}$$

where past.margin is the total past margin used above reserves for all time windows associated with the radios; norm.exposure.reports is the total normalized exposure for all time instances; sum(max(base.res$_i$, dyn.res$_i$)) for all radios represents the sum of the respective base reserves or respective dynamic reserves (depending on which is greatest for a particular radio) among the radios; sum(buffer$_i$*$\Delta t$/T (K$_i$)) for all radios represents the sum of the proportional buffer margins among the radios; $\Delta t$ is a time interval of a time-averaging time window (e.g., T1, T2, and T3); and T(K$_i$) is the time-averaging time window (e.g., T1, T2, or T3) associated with the respective radio. The time intervals for different time windows may have the same duration, or the time intervals may be different between two or more windows in any of the examples described herein. In some examples, the duration of a time interval in one time window is a multiple of the duration of a time interval in another time window.

The portion of total exposure in the past that is more than the reserves allocated to all radios (first.margin) may be determined according to the following:

$$\text{first.margin} = 1 - \text{sum}(\max(\text{base.res}_i, \text{dyn.res}_i) \text{ for all radios}) - \text{sum}(\text{buffer}_i * \Delta t / T(K_i) \text{ for all radios}) - \text{past.margin}.$$

If the first.margin value is negative, that may mean that the reserves and buffer margins requested by the radios are not sustainable. In such a scenario, the wireless device may lower one or more of reserves or buffer margins depending on radio priorities, for example. After determining the adjusted reserves and buffers, the second.margin may be computed according to Expression (1), for example.

In certain wireless communication networks (such as CDMA2000, UMTS, E-UTRA, and/or 5G NR), a UE may be capable of communicating with one or more wireless networks via a plurality of subscriptions (e.g., via a plurality of subscriber identity modules (SIMs) or universal SIMs (USIMs)). A UE with multiple subscription capabilities (e.g., multiple SIMs) may be able to access various services or functions associated with each of the subscriptions, such as a different subscriber account, a different network (e.g., a RAN), and/or a different radio access technology (RAT) (e.g., E-UTRA or 5G NR). In certain cases, the UE may have a SIM for business use and another SIM for private use, where each SIM provides a separate phone number and/or data services (e.g., 5G NR and/or E-UTRA data services). In other cases, an additional SIM may be employed when the UE is taken to a different country with a different RAN or RAT than the home country. Some multiple subscription configurations enable each subscription to be active simultaneously, allowing communications at any given time, such as a Dual SIM Single Standby (DSSS), Dual SIM Dual Standby (DSDS), Dual SIM Dual Active (DSDA), Triple SIM Triple Standby (TSTS), etc. As an example, DSDA radios can switch priorities at a high frequency, for example, at a symbol level. Computation of the allowed margin/limits (for example, as described herein with respect to second- .margin) for the respective radios in response to the switch in priorities may not be feasible, for example, due to the processing time involved and/or power constraints in processing the updated margins and/or reserve(s) at such frequencies.

In a multi-subscription case, the wireless device may be configured with sets of values for the reserves and/or margins for particular radios. The sets of values for the reserves and/or margins may be used in response to a particular subscription having priority over another subscription. For example, the wireless device may use a first set of values for the reserves and/or margins for certain radios if a first subscription has priority over a second subscription, and the wireless device may use a second set of values for the reserves and/or margins for certain radios if the second subscription has priority over the first subscription.

Sets of reserves and/or margins (for example, as described herein with respect to second.margin) may be computed for each of the subscriptions to be applied for a certain time interval, e.g., 500 milliseconds (ms). During the time interval, the wireless device may have an active subscription with a priority over one or more other subscriptions. The subscription priority might change over time, for example, at a symbol, slot, or frame level (or in milliseconds or microseconds). The wireless device may select to apply a certain set of reserves and/or margins in response to a first subscription having a priority over one or more other priorities for the time interval, and the wireless device may apply another set of reserves and/or margins for another time interval in response to a second subscription having a priority over other subscriptions.

The wireless device may determine the base reserve, the dynamic reserve, the buffer margin, and/or the second margin for each of the radios according to a first set of reserve values, if a first subscription associated with the radios is prioritized over a second subscription associated with the radios. The wireless device may determine the base reserve, the dynamic reserve, the buffer margin, and/or the second margin for each of the radios according to a second set of reserve values, if the second subscription is prioritized over the first subscription. The first and/or second set of reserve values may include specific values for the base reserve, the dynamic reserve, the buffer margin, and/or the second margin for each of the radios.

In certain aspects, the determination of reserves and/or margin may consider periodic control signaling and/or periodic user traffic, such as voice traffic, video call traffic, video streaming traffic, online gaming traffic, etc. The periodic control and/or user traffic may be prioritized, such that a dynamic reserve is allocated to facilitate the periodic user traffic for a given radio. For example, a particular radio may be allocated enough dynamic reserve to transmit the periodic traffic at a transmit power that is capable of enabling reception of the periodic traffic, for example, given the current radio conditions (e.g., path loss). In certain aspects, the periodic user traffic can be preserved for radios with low maximum time-averaged RF exposure limits ($P_{limit}$), for example, due to different active (or current) exposure scenarios (e.g., head exposure, body or torso exposure, hand or extremity exposure, hotspot exposure, etc.). For example, $P_{limit}$ may be lower for a hand exposure scenario compared to $P_{limit}$ for certain antennas in a head exposure scenario. To be compliant with differing RF exposure limits, for example, when a wireless device is held against the head with the hand, thereby invoking the head and hand exposure scenarios, the wireless device may apply the lowest value of the $P_{limits}$ for the radios among the active (or current) exposure scenarios. The wireless device may prioritize the dynamic reserve for a radio in the plurality of radios with voice traffic over the dynamic reserve for each of other radios in the plurality of radios.

As an example, the dynamic reserve may be a normalized ratio transmit power equal to $P_{desired}$ over $P_{limit}$ multiplied by a factor indicative of the duty cycle(s), such as a sum of a control channel duty cycle and a voice channel duty cycle (e.g., 5%). The estimated duty cycles may have an upper bound (e.g., 10%) to handle certain network fluctuations for current radio conditions. Here, $P_{desired}$ may be a certain transmit power that is a function of path loss, which may be determined based on closed loop power control (for example, $P_{desired}=P_{max}$ at cell edge). The buffer margin may account for short periods (e.g., 200 ms) of a worst-case duty cycle (e.g., 50%). By accounting for voice duty cycle, the dynamic reserve level may be kept low (<1) so that the dynamic reserve can be guaranteed even for low time-averaged RF exposure limit ($P_{limit}$) radios (for example, due to a hand exposure scenario). The voice link may be prioritized and can be guaranteed even for low $P_{limit}$ radios by taking advantage of the voice duty cycle. A low $P_{limit}$ may be encountered in a head and hand exposure scenario, when the wireless device is held to the user's head with the user's hand. The hand exposure may lower the overall RF exposure limit, for example, due to the wireless device selecting the lowest $P_{limit}$ among the active $P_{limit}$ for the radios.

For certain aspects, the operations for allocating the RF exposure margins described herein may be performed using centralized processing, for example as described herein with respect to FIG. 8. For example, the wireless device (e.g., the RF exposure manager) may obtain, from each of the radios, a request indicating values for the base reserve, the dynamic reserve, and/or buffer margin for the respective radio. The wireless device (e.g., the RF exposure manager) may determine the base reserve, the dynamic reserve, and/or the buffer margin for each of the radios based on the requests obtained from all the radios, priorities and past usage of normalized exposure (for example, as described herein with respect to FIG. 7).

In certain aspects, the wireless device may consider only the base reserve in allocating margins to the radios. For example, the wireless device may determine a base reserve for each of a plurality of radios, where the base reserve for each of the radios is a guaranteed reserve of transmit power regardless of whether the respective radio is operating (e.g., transmitting or not transmitting). The wireless device may transmit a signal with at least one of the radios at a transmit power determined based at least in part on RF exposure limits associated with each of the radios and on the base reserve for each of the radios (e.g., at block 906). In some examples, the transmit power is within the margin calculated for that radio (e.g., second.margin$_i$).

While the examples depicted in FIGS. 1-9 are described herein with respect to a UE performing the various methods for providing RF exposure compliance to facilitate understanding, aspects of the present disclosure may also be applied to other wireless communication devices (wireless devices), such as a base station and/or a CPE, performing the RF exposure compliance described herein. Further, while the examples are described with respect to communication between the UE (or other wireless device) and a network entity, the UE or other wireless device may be communicating with a device other than a network entity, for example another UE or with another device in a user's home that is not a network entity, for example.

It will be appreciated that the energy allocation described herein may enable desirable uplink performance, such as desirable wireless communication performance, such as uplink data rates, uplink carrier aggregation, and/or an uplink connection at the edge of a cell.

Example Communications Device

Figure 10:
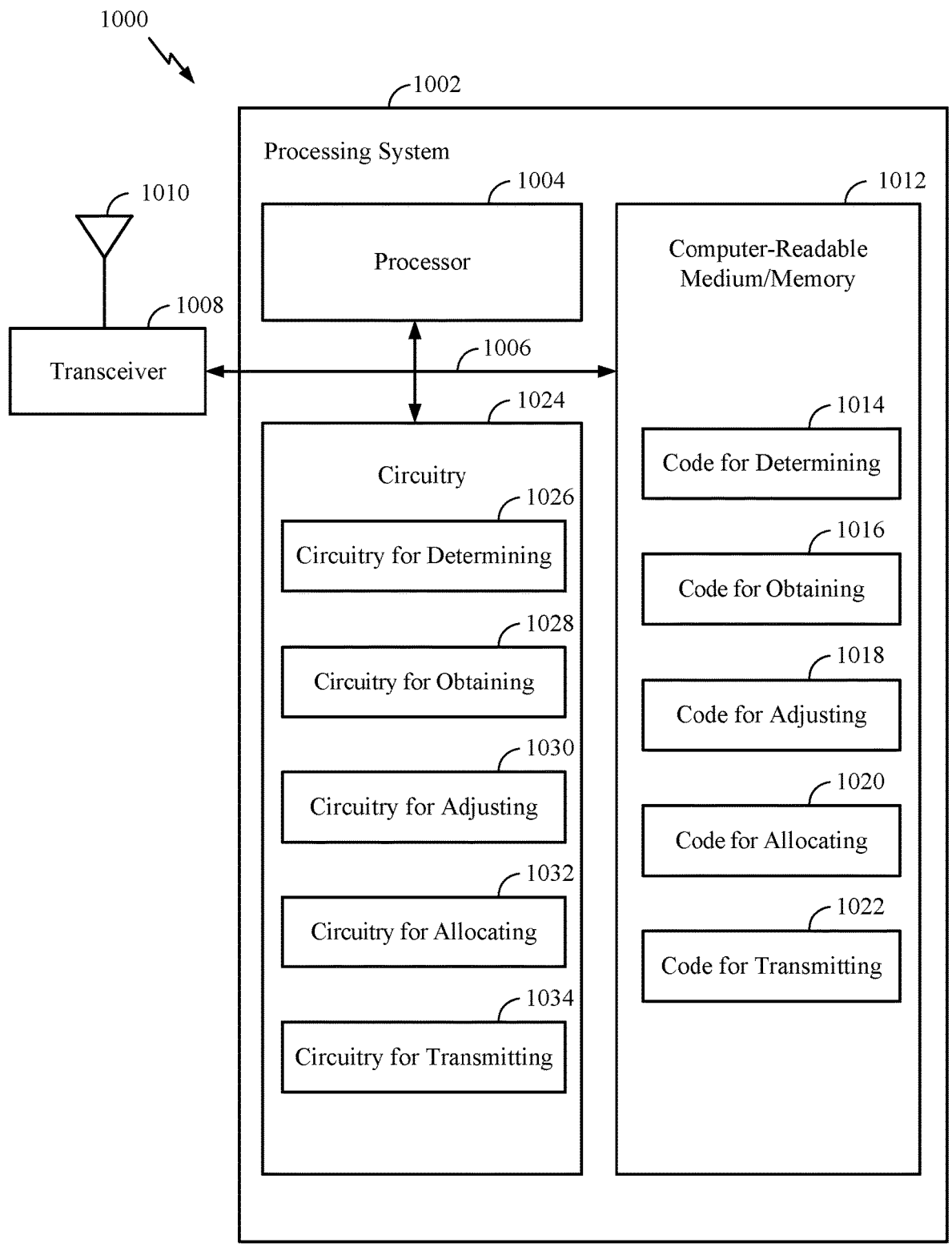
FIG. 10 illustrates a communications device (e.g., a UE) that may include various components configured to perform operations for the techniques disclosed herein, in accordance with certain aspects of the present disclosure.

FIG. 10 illustrates a communications device 1000 (e.g., the UE 120) that may include various components (e.g., corresponding to means-plus-function components) configured to perform operations for the techniques disclosed herein, such as the operations illustrated in FIG. 9. The communications device 1000 includes a processing system 1002, which may be coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein for providing RF exposure compliance. In certain aspects, computer-readable medium/memory 1012 stores code for determining 1014, code for obtaining 1016, code for adjusting 1018, code for allocating 1020, and/or code for transmitting (or outputting for transmission or providing) 1022. In certain aspects, the processing system 1002 has circuitry 1024 configured to implement the code stored in the computer-readable medium/memory 1012. In certain aspects, the circuitry 1024 is coupled to the processor 1004 and/or the computer-readable medium/memory 1012 via the bus 1006. For example, the circuitry 1024 includes circuitry for determining 1026, circuitry for obtaining 1028, circuitry for adjusting 1030, circuitry for allocating 1032, and/or circuitry for transmitting (or outputting for transmission or providing) 1034.

Means for transmitting (or means for outputting for transmission) may include a transmitter and one or more antennas, such as the transceiver 254 and/or antenna(s) 252 of the UE 120a illustrated in FIG. 2 and/or circuitry for transmitting 1034 of the communications device 1000 in FIG. 10. Means for determining, means for obtaining, means for adjusting, and/or means for allocating may include a processing system, which may include one or more processors, such as the receive processor 258, the transmit processor 264, the TX MIMO processor 266, and/or the controller/processor 280 of the UE 120a illustrated in FIG. 2, the processing system 1002 of the communications device 1000 in FIG. 10, and/or the circuitry for determining 1026, circuitry for obtaining 1028, circuitry for adjusting 1030, and/or circuitry for allocating 1032.

Example Aspects

Implementation examples are described in the following numbered clauses:

Aspect 1: A method of wireless communication by a wireless device, comprising: determining a base reserve and a dynamic reserve for each of a plurality of radios; and transmitting a signal with at least one of the radios at a transmit power determined based at least in part on one or more maximum time-averaged radio frequency (RF) exposure limits associated with each of the radios and on the base reserve and the dynamic reserve for each of the radios.

Aspect 2: The method of Aspect 1, further comprising: obtaining, from each of the radios, a request indicating values for the base reserve and the dynamic reserve for the respective radio, wherein determining the base reserve and the dynamic reserve comprises determining the base reserve and the dynamic reserve for each of the radios based on the requests obtained from the radios.

Aspect 3: The method of Aspect 1 or 2, wherein the base reserve for each of the radios is a guaranteed reserve of transmit power for the respective radio regardless of whether the respective radio is operating.

Aspect 4: The method according to any of Aspects 1-3, wherein the base reserve for each of the radios is allocated for a full duration of a time window associated with the maximum time-averaged RF exposure limit associated with the respective radio.

Aspect 5: The method according to any of Aspects 1-4, wherein the dynamic reserve for each of the radios includes a reserve of transmit power dynamically allocated according to one or more criteria for the respective radio.

Aspect 6: The method of Aspect 5, wherein the one or more criteria comprise: one or more radio conditions associated with the respective radio; one or more duty cycles for transmissions associated with the respective radio; or a combination thereof.

Aspect 7: The method of Aspect 6, wherein the one or more duty cycles comprise a first duty cycle for control signaling and a second duty cycle for user traffic.

Aspect 8: The method according to any of Aspects 1-7, wherein the dynamic reserve for each of the radios is allocated for a full duration of a time window associated with the maximum time-averaged RF exposure limit associated with the respective radio.

Aspect 9: The method according to any of Aspects 1-8, wherein transmitting the signal comprises transmitting the signal with the at least one of the radios at the transmit power determined based at least in part on a summation of the dynamic reserve for each of the radios.

Aspect 10: The method according to any of Aspects 1-19, further comprising: determining a buffer margin for each of the radios, wherein transmitting the signal comprises transmitting the signal with at least one of the radios at the transmit power determined based at least in part on the RF exposure limits associated with each of the radios and on the base reserve, the dynamic reserve, and the buffer margin for each of the radios.

Aspect 11: The method of Aspect 10, wherein the buffer margin for each of the radios comprises a reserve of transmit power dynamically allocated for unexpected transmissions with the respective radio.

Aspect 12: The method of Aspect 10 or 11, wherein the buffer margin for each of the radios is allocated for a portion of a time window associated with the RF exposure limit associated with the respective radio.

Aspect 13: The method according to any of Aspects 10-12, wherein determining the base reserve, the dynamic reserve, and the buffer margin comprises: determining a reserve for each of the radios as a greatest value among the base reserve and the dynamic reserve for the respective radio; and adjusting at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

Aspect 14: The method of Aspect 13, wherein adjusting at least one of the dynamic reserve or the buffer margin comprises adjusting at least one of the dynamic reserve or the buffer margin for each of the radios based on priorities associated with the radios.

Aspect 15: The method according to any of Aspects 10-14, further comprising: determining a first margin based at least in part on the base reserve, the dynamic reserve, and the buffer margin for each of the radios; allocating a second margin to each of the radios based on the first margin; and determining the transmit power based at least in part on the RF exposure limits, the base reserve, the dynamic reserve, the buffer margin, and the second margin for each of the radios.

Aspect 16: The method of Aspect 15, wherein allocating the second margin comprises allocating a portion of the first margin to each of the radios as the second margin for each of the radios.

Aspect 17: The method according to Aspect 15 or 16, wherein allocating the second margin comprises allocating the second margin based on a total past RF exposure associated with the radios.

Aspect 18: The method according to any of Aspects 15-17, wherein determining the base reserve, the dynamic reserve, and the buffer margin comprises: determining the base reserve, the dynamic reserve, the buffer margin, and the second margin for each of the radios according to a first set of reserve values, if a first subscription associated with the radios is prioritized over a second subscription associated with the radios; and determining the base reserve, the dynamic reserve, the buffer margin, and the second margin for each of the radios according to a second set of reserve values, if the second subscription is prioritized over the first subscription.

Aspect 19: The method according to any of Aspects 10-18, wherein determining the base reserve, the dynamic reserve, and the buffer margin comprises prioritizing the dynamic reserve for a radio in the plurality of radios with voice traffic over the dynamic reserve for each of other radios in the plurality of radios.

Aspect 20: A method of wireless communication by a wireless device, comprising: determining a base reserve for each of a plurality of radios, wherein the base reserve for each of the radios is a guaranteed reserve of transmit power regardless of whether the respective radio is operating; and transmitting a signal with at least one of the radios at a transmit power determined based at least in part on one or more maximum time-averaged radio frequency (RF) exposure limits associated with each of the radios and on the base reserve for each of the radios.

Aspect 21: The method of Aspect 20, wherein the base reserve for each of the radios is allocated for a full duration of a time window associated with the maximum time-averaged RF exposure limit associated with the respective radio.

Aspect 22: An apparatus for wireless communication, comprising: a memory; and a processor coupled to the memory, the processor and the memory being configured to: determine a base reserve and a dynamic reserve for each of a plurality of radios, and control transmission of a signal with at least one of the radios at a transmit power determined based at least in part on one or more maximum time-averaged radio frequency (RF) exposure limits associated with each of the radios and on the base reserve and the dynamic reserve for each of the radios.

Aspect 23: An apparatus for wireless communication, comprising: a memory; and a processor coupled to the memory, the processor and the memory being configured to: determine a base reserve for each of a plurality of radios, wherein the base reserve for each of the radios is a guaranteed reserve of transmit power regardless of whether the respective radio is operating, and control transmission of a signal with at least one of the radios at a transmit power determined based at least in part on one or more maximum time-averaged radio frequency (RF) exposure limits associated with each of the radios and on the base reserve for each of the radios.

Aspect 24: An apparatus for wireless communication, comprising: means for determining a base reserve and a dynamic reserve for each of a plurality of radios; and means for transmitting a signal with at least one of the radios at a transmit power determined based at least in part on one or more maximum time-averaged radio frequency (RF) exposure limits associated with each of the radios and on the base reserve and the dynamic reserve for each of the radios.

Aspect 25: An apparatus for wireless communication, comprising: means for determining a base reserve for each of a plurality of radios, wherein the base reserve for each of the radios is a guaranteed reserve of transmit power regardless of whether the respective radio is operating; and means for transmitting a signal with at least one of the radios at a transmit power determined based at least in part on one or more maximum time-averaged radio frequency (RF) exposure limits associated with each of the radios and on the base reserve for each of the radios.

Aspect 26: A computer-readable medium having instructions stored thereon for: determining a base reserve and a dynamic reserve for each of a plurality of radios; and transmitting a signal with at least one of the radios at a transmit power determined based at least in part on one or more maximum time-averaged radio frequency (RF) exposure limits associated with each of the radios and on the base reserve and the dynamic reserve for each of the radios.

Aspect 27: A computer-readable medium having instructions stored thereon for: determining a base reserve for each of a plurality of radios, wherein the base reserve for each of the radios is a guaranteed reserve of transmit power regardless of whether the respective radio is operating; and transmitting a signal with at least one of the radios at a transmit power determined based at least in part on one or more maximum time-averaged radio frequency (RF) exposure limits associated with each of the radios and on the base reserve for each of the radios.

Aspect 28: A method of wireless communication by a wireless device, comprising: determining a base reserve and a dynamic reserve for each of a plurality of radios; and transmitting a signal with at least one of the radios at a transmit power determined based at least in part on one or more maximum time-averaged radio frequency (RF) exposure limits associated with each of the radios and on the base reserve and the dynamic reserve for each of the radios.

Aspect 29: The method of Aspect 28, further comprising obtaining, from each of the radios, a request indicating values for the base reserve and the dynamic reserve for the respective radio, wherein determining the base reserve and the dynamic reserve comprises determining the base reserve and the dynamic reserve for each of the radios based on the requests obtained from the radios.

Aspect 30: The method of Aspect 28 or 29, wherein: the base reserve for each of the radios is a guaranteed reserve of transmit power for the respective radio regardless of whether the respective radio is operating; and the base reserve for each of the radios is allocated for a full duration of a time window associated with the respective maximum time-averaged RF exposure limits associated with the respective radio.

Aspect 31: The method according to any of Aspects 28-30, wherein: the dynamic reserve for each of the radios includes a reserve of transmit power dynamically allocated according to one or more criteria for the respective radio; and the dynamic reserve for each of the radios is allocated for a full duration of a time window associated with the maximum time-averaged RF exposure limits associated with the respective radio.

Aspect 32: The method of Aspect 31, wherein the one or more criteria comprise: one or more radio conditions associated with the respective radio; one or more duty cycles for transmissions associated with the respective radio; or a combination thereof.

Aspect 33: The method of Aspect 32, wherein the one or more duty cycles comprise a first duty cycle for control signaling and a second duty cycle for user traffic.

Aspect 34: The method according to any of Aspects 28-33, wherein transmitting the signal comprises transmitting the signal with the at least one of the radios at the transmit power determined based at least in part on a summation of the dynamic reserve for each of the radios.

Aspect 35: The method according to any of Aspects 28-34, further comprising determining a buffer margin for each of the radios, wherein transmitting the signal comprises transmitting the signal with the at least one of the radios at the transmit power determined based at least in part on the maximum time-averaged RF exposure limits associated with each of the radios and on the base reserve, the dynamic reserve, and the buffer margin for each of the radios.

Aspect 36: The method of Aspect 35, wherein: the buffer margin for each of the radios comprises a reserve of transmit power dynamically allocated for unexpected transmissions with the respective radio; and the buffer margin for each of the radios is allocated for a portion of a time window associated with the maximum time-averaged RF exposure limits associated with the respective radio.

Aspect 37: The method of Aspect 35 or 36, wherein determining the base reserve, the dynamic reserve, and the buffer margin comprises: determining a reserve for each of the radios as a greatest value among the base reserve and the dynamic reserve for the respective radio; and adjusting at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

Aspect 38: The method of Aspect 37, wherein adjusting the at least one of the dynamic reserve or the buffer margin comprises adjusting the at least one of the dynamic reserve or the buffer margin for each of the radios based on priorities associated with the radios.

Aspect 39: The method according to any of Aspects 35-38, further comprising: determining a first margin based at least in part on the base reserve, the dynamic reserve, and the buffer margin for each of the radios; allocating a second margin to each of the radios based on the first margin; and determining the transmit power based at least in part on the maximum time-averaged RF exposure limits, the base reserve, the dynamic reserve, the buffer margin, and the second margin for each of the radios.

Aspect 40: The method of Aspect 39, wherein allocating the second margin comprises allocating a portion of the first margin to each of the radios as the second margin for each of the radios.

Aspect 41: The method of Aspect 39 or 40, wherein allocating the second margin comprises allocating the second margin based on a total past RF exposure associated with the radios.

Aspect 42: A method of wireless communication by a wireless device, comprising: determining a base reserve for each of a plurality of radios, wherein the base reserve for each of the radios is a guaranteed reserve of transmit power regardless of whether the respective radio is operating; and transmitting a signal with at least one of the radios at a transmit power determined based at least in part on one or more maximum time-averaged radio frequency (RF) exposure limits associated with each of the radios and on the base reserve for each of the radios.

Aspect 43: The method of Aspect 42, wherein the base reserve for each of the radios is allocated for a full duration of a time window associated with the maximum time-averaged RF exposure limits associated with the respective radio.

Aspect 44: An apparatus for wireless communication by a wireless device, comprising: a memory; and a processor coupled to the memory, the processor being configured to: determine a base reserve and a dynamic reserve for each of a plurality of radios, and control transmission of a signal with at least one of the radios at a transmit power determined based at least in part on one or more maximum time-averaged radio frequency (RF) exposure limits associated with each of the radios and on the base reserve and the dynamic reserve for each of the radios.

Aspect 45: The apparatus of Aspect 44, wherein: the processor is further configured to obtain, from each of the radios, a request indicating values for the base reserve and the dynamic reserve for the respective radio; and the processor is further configured to determine the base reserve and the dynamic reserve for each of the radios based on the requests obtained from the radios.

Aspect 46: The apparatus of Aspect 44 or 45, wherein: the base reserve for each of the radios is a guaranteed reserve of transmit power for the respective radio regardless of whether the respective radio is operating; and the base reserve for each of the radios is allocated for a full duration of a time window associated with the maximum time-averaged RF exposure limits associated with the respective radio.

Aspect 47: The apparatus according to any of Aspects 44-46, wherein: the dynamic reserve for each of the radios includes a reserve of transmit power dynamically allocated according to one or more criteria for the respective radio; and the dynamic reserve for each of the radios is allocated for a full duration of a time window associated with the maximum time-averaged RF exposure limits associated with the respective radio.

Aspect 48: The apparatus of Aspect 47, wherein the one or more criteria comprise: one or more radio conditions associated with the respective radio; one or more duty cycles for transmissions associated with the respective radio; or a combination thereof.

Aspect 49: The apparatus of Aspect 48, wherein the one or more duty cycles comprise a first duty cycle for control signaling and a second duty cycle for user traffic.

Aspect 50: The apparatus according to any of Aspects 44-49, wherein the processor is configured to control the transmission of the signal with the at least one of the radios at the transmit power further determined based at least in part on a summation of the dynamic reserve for each of the radios.

Aspect 51: The apparatus according to any of Aspects 44-50, further comprising: a transmitter configured to transmit the signal with the at least one of the radios at the transmit power, wherein: the processor is further configured to determine a buffer margin for each of the radios; and the processor is configured to control transmission of the signal with the at least one of the radios at the transmit power further determined based at least in part on the buffer margin for each of the radios.

Aspect 52: The apparatus of Aspect 51, wherein: the buffer margin for each of the radios comprises a reserve of transmit power dynamically allocated for unexpected transmissions with the respective radio; and the buffer margin for each of the radios is allocated for a portion of a time window associated with the maximum time-averaged RF exposure limits associated with the respective radio.

Aspect 53: The apparatus of Aspect 51 or 52, wherein to determine the base reserve, the dynamic reserve, and the buffer margin, the processor is further configured to: determine a reserve for each of the radios as a greatest value among the base reserve and the dynamic reserve for the respective radio, and adjust at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

Aspect 54: The apparatus of Aspect 53, wherein to adjust at least one of the dynamic reserve or the buffer margin, the processor is further configured to adjust at least one of the dynamic reserve or the buffer margin for each of the radios based on priorities associated with the radios.

Aspect 55: The apparatus according to any of Aspects 51-54, wherein the processor is further configured to: determine a first margin based at least in part on the base reserve, the dynamic reserve, and the buffer margin for each of the radios, allocate a second margin to each of the radios based on the first margin, and determine the transmit power based at least in part on the maximum time-averaged RF exposure limits, the base reserve, the dynamic reserve, the buffer margin, and the second margin for each of the radios.

Aspect 56: The apparatus of Aspect 55, wherein to allocate the second margin, the processor is further configured to allocate a portion of the first margin to each of the radios as the second margin for each of the radios.

Aspect 57: The apparatus of Aspect 55 or 56, wherein to allocate the second margin, the processor is further configured to allocate the second margin based on a total past RF exposure associated with the radios.

Aspect 58: An apparatus for wireless communication, comprising: means for determining a base reserve and a dynamic reserve for each of a plurality of radios; and means for transmitting a signal with at least one of the radios at a transmit power determined based at least in part on one or more maximum time-averaged radio frequency (RF) exposure limits associated with each of the radios and on the base reserve and the dynamic reserve for each of the radios.

Aspect 59: The apparatus of Aspect 58, further comprising means for obtaining, from each of the radios, a request indicating values for the base reserve and the dynamic reserve for the respective radio, wherein the means for determining the base reserve and the dynamic reserve is configured to determine the base reserve and the dynamic reserve for each of the radios based on the requests obtained from the radios.

Aspect 60: The apparatus of Aspect 58 or 59, wherein: the base reserve for each of the radios is a guaranteed reserve of transmit power for the respective radio regardless of whether the respective radio is operating; and the base reserve for each of the radios is allocated for a full duration of a time window associated with the respective maximum time-averaged RF exposure limits associated with the respective radio.

Aspect 61: The apparatus according to any of Aspects 58-60, wherein: the dynamic reserve for each of the radios includes a reserve of transmit power dynamically allocated according to one or more criteria for the respective radio; and the dynamic reserve for each of the radios is allocated for a full duration of a time window associated with the maximum time-averaged RF exposure limits associated with the respective radio.

Aspect 62: The apparatus of Aspect 61, wherein the one or more criteria comprise: one or more radio conditions associated with the respective radio; one or more duty cycles for transmissions associated with the respective radio; or a combination thereof.

Aspect 63: The apparatus of Aspect 62, wherein the one or more duty cycles comprise a first duty cycle for control signaling and a second duty cycle for user traffic.

Aspect 64: The apparatus according to any of Aspects 58-63, wherein the means for transmitting the signal is configured to transmit the signal with the at least one of the radios at the transmit power determined based at least in part on a summation of the dynamic reserve for each of the radios.

Aspect 65: The apparatus according to any of Aspects 58-64, further comprising means for determining a buffer margin for each of the radios, wherein the means for transmitting the signal is configured to transmit the signal with the at least one of the radios at the transmit power determined based at least in part on the maximum time-averaged RF exposure limits associated with each of the radios and on the base reserve, the dynamic reserve, and the buffer margin for each of the radios.

Aspect 66: The apparatus of Aspect 65, wherein: the buffer margin for each of the radios comprises a reserve of transmit power dynamically allocated for unexpected transmissions with the respective radio; and the buffer margin for each of the radios is allocated for a portion of a time window associated with the maximum time-averaged RF exposure limits associated with the respective radio.

Aspect 67: The apparatus of Aspect 65 or 66, wherein the means for determining the base reserve, the dynamic reserve, and the buffer margin is configured to: determine a reserve for each of the radios as a greatest value among the base reserve and the dynamic reserve for the respective radio; and adjust at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

Aspect 68: The apparatus of Aspect 67, wherein to adjust the at least one of the dynamic reserve or the buffer margin, the means for determining the dynamic reserve and the buffer margin is further configured to adjust the at least one of the dynamic reserve or the buffer margin for each of the radios based on priorities associated with the radios.

Aspect 69: The apparatus according to any of Aspects 65-68, further comprising: means for determining a first margin based at least in part on the base reserve, the dynamic reserve, and the buffer margin for each of the radios; means for allocating a second margin to each of the radios based on the first margin; and means for determining the transmit power based at least in part on the maximum time-averaged RF exposure limits, the base reserve, the dynamic reserve, the buffer margin, and the second margin for each of the radios.

Aspect 70: The apparatus of Aspect 69, wherein the means for allocating the second margin is configured to allocate a portion of the first margin to each of the radios as the second margin for each of the radios.

Aspect 71: The apparatus of Aspect 69 or 70, wherein the means for allocating the second margin is configured to allocate the second margin based on a total past RF exposure associated with the radios.

Aspect 72: An apparatus for wireless communication, comprising: means for determining a base reserve for each of a plurality of radios, wherein the base reserve for each of the radios is a guaranteed reserve of transmit power regardless of whether the respective radio is operating; and means for transmitting a signal with at least one of the radios at a transmit power determined based at least in part on one or more maximum time-averaged radio frequency (RF) exposure limits associated with each of the radios and on the base reserve for each of the radios.

Aspect 73: The apparatus of Aspect 72, wherein the base reserve for each of the radios is allocated for a full duration of a time window associated with the maximum time-averaged RF exposure limits associated with the respective radio.

Aspect 74: An apparatus, comprising: a memory comprising executable instructions; and one or more processors configured to execute the executable instructions and cause the apparatus to perform a method in accordance with any of Aspects 1-21 or 28-43.

Aspect 75: An apparatus, comprising means for performing a method in accordance with any of Aspects 1-21 or 28-43.

Aspect 76: A computer-readable medium comprising executable instructions that, when executed by one or more processors of an apparatus, cause the apparatus to perform a method in accordance with any of Aspects 1-21 or 28-43.

Aspect 77: A computer program product embodied on a computer-readable storage medium comprising code for performing a method in accordance with any of Aspects 1-21 or 28-43.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (random access memory), flash memory, ROM (read-only memory), PROM (programmable read-only memory), EPROM (erasable programmable read-only memory), EEPROM (electrically erasable programmable read-only memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
   determining a base reserve and a dynamic reserve for each of a plurality of radios; and
   transmitting a signal with at least one of the radios at a transmit power determined based at least in part on one or more maximum time-averaged radio frequency (RF) exposure limits associated with each of the radios and on the base reserve and the dynamic reserve for each of the radios, the dynamic reserve for each of the radios including a reserve of transmit power dynamically allocated according to one or more criteria for the respective radio.

2. The method of claim 1, further comprising obtaining, from each of the radios, a request indicating values for the base reserve and the dynamic reserve for the respective radio, wherein determining the base reserve and the dynamic reserve comprises determining the base reserve and the dynamic reserve for each of the radios based on the requests obtained from the radios.

3. The method of claim 1, wherein:
   the base reserve for each of the radios is a guaranteed reserve of transmit power for the respective radio regardless of whether the respective radio is operating; and
   the base reserve for each of the radios is allocated for a full duration of a time window associated with the respective maximum time-averaged RF exposure limits associated with the respective radio.

4. The method of claim 1, wherein:
the dynamic reserve for each of the radios is allocated for a full duration of a time window associated with the maximum time-averaged RF exposure limits associated with the respective radio.

5. The method of claim 4, wherein the one or more criteria comprise:
one or more radio conditions associated with the respective radio;
one or more duty cycles for transmissions associated with the respective radio; or
a combination thereof.

6. The method of claim 5, wherein the one or more duty cycles comprise a first duty cycle for control signaling and a second duty cycle for user traffic.

7. The method of claim 1, wherein transmitting the signal comprises transmitting the signal with the at least one of the radios at the transmit power determined based at least in part on a summation of the dynamic reserve for each of the radios.

8. The method of claim 1, further comprising determining a buffer margin for each of the radios, wherein transmitting the signal comprises transmitting the signal with the at least one of the radios at the transmit power determined based at least in part on the maximum time-averaged RF exposure limits associated with each of the radios and on the base reserve, the dynamic reserve, and the buffer margin for each of the radios.

9. The method of claim 8, wherein:
the buffer margin for each of the radios comprises a reserve of transmit power dynamically allocated for unexpected transmissions with the respective radio; and
the buffer margin for each of the radios is allocated for a portion of a time window associated with the maximum time-averaged RF exposure limits associated with the respective radio.

10. The method of claim 8, wherein determining the base reserve, the dynamic reserve, and the buffer margin comprises:
determining a reserve for each of the radios as a greatest value among the base reserve and the dynamic reserve for the respective radio; and
adjusting at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

11. The method of claim 10, wherein adjusting the at least one of the dynamic reserve or the buffer margin comprises adjusting the at least one of the dynamic reserve or the buffer margin for each of the radios based on priorities associated with the radios.

12. The method of claim 8, further comprising:
determining a first margin based at least in part on the base reserve, the dynamic reserve, and the buffer margin for each of the radios;
allocating a second margin to each of the radios based on the first margin; and
determining the transmit power based at least in part on the maximum time-averaged RF exposure limits, the base reserve, the dynamic reserve, the buffer margin, and the second margin for each of the radios.

13. The method of claim 12, wherein allocating the second margin comprises:
allocating a portion of the first margin to each of the radios as the second margin for each of the radios; or
allocating the second margin based on a total past RF exposure associated with the radios.

14. The method of claim 1, wherein the transmit power is determined to be greater than a maximum of the base reserve and the dynamic reserve.

15. A method of wireless communication by a wireless device, comprising:
determining a base reserve for each of a plurality of radios, wherein the base reserve for each of the radios is a guaranteed reserve of transmit power regardless of whether the respective radio is operating; and
transmitting a signal with at least one of the radios at a transmit power determined based at least in part on one or more maximum time-averaged radio frequency (RF) exposure limits associated with each of the radios and on the base reserve for each of the radios.

16. The method of claim 15, wherein the base reserve for each of the radios is allocated for a full duration of a time window associated with the maximum time-averaged RF exposure limits associated with the respective radio.

17. An apparatus for wireless communication by a wireless device, comprising:
memory; and
one or more processors coupled to the memory, the one or more processors, individually or collectively, being configured to:
determine a base reserve and a dynamic reserve for each of a plurality of radios, and
control transmission of a signal with at least one of the radios at a transmit power determined based at least in part on one or more maximum time-averaged radio frequency (RF) exposure limits associated with each of the radios and on the base reserve and the dynamic reserve for each of the radios, the dynamic reserve for each of the radios including a reserve of transmit power dynamically allocated according to one or more criteria for the respective radio.

18. The apparatus of claim 17, wherein:
the one or more processors, individually or collectively, are further configured to obtain, from each of the radios, a request indicating values for the base reserve and the dynamic reserve for the respective radio; and
the one or more processors, individually or collectively, are further configured to determine the base reserve and the dynamic reserve for each of the radios based on the requests obtained from the radios.

19. The apparatus of claim 17, wherein:
the base reserve for each of the radios is a guaranteed reserve of transmit power for the respective radio regardless of whether the respective radio is operating; and
the base reserve for each of the radios is allocated for a full duration of a time window associated with the maximum time-averaged RF exposure limits associated with the respective radio.

20. The apparatus of claim 17, wherein:
the dynamic reserve for each of the radios is allocated for a full duration of a time window associated with the maximum time-averaged RF exposure limits associated with the respective radio.

21. The apparatus of claim 20, wherein the one or more criteria comprise:
one or more radio conditions associated with the respective radio;

one or more duty cycles for transmissions associated with the respective radio; or a combination thereof.

22. The apparatus of claim 21, wherein the one or more duty cycles comprise a first duty cycle for control signaling and a second duty cycle for user traffic.

23. The apparatus of claim 17, wherein the one or more processors, individually or collectively, are configured to control the transmission of the signal with the at least one of the radios at the transmit power further determined based at least in part on a summation of the dynamic reserve for each of the radios.

24. The apparatus of claim 17, further comprising:

a transmitter configured to transmit the signal with the at least one of the radios at the transmit power, wherein:

the one or more processors, individually or collectively, are further configured to determine a buffer margin for each of the radios; and the one or more processors, individually or collectively, are configured to control transmission of the signal with the at least one of the radios at the transmit power further determined based at least in part on the buffer margin for each of the radios.

25. The apparatus of claim 24, wherein:

the buffer margin for each of the radios comprises a reserve of transmit power dynamically allocated for unexpected transmissions with the respective radio; and the buffer margin for each of the radios is allocated for a portion of a time window associated with the maximum time-averaged RF exposure limits associated with the respective radio.

26. The apparatus of claim 24, wherein to determine the base reserve, the dynamic reserve, and the buffer margin, the one or more processors, individually or collectively, are further configured to:

determine a reserve for each of the radios as a greatest value among the base reserve and the dynamic reserve for the respective radio, and adjust at least one of the dynamic reserve or the buffer margin for one or more of the radios such that a sum of the reserve for each of the radios, the buffer margin for each of the radios, and a past total exposure usage above a past margin is less than a normalized maximum time-averaged RF exposure limit.

27. The apparatus of claim 26, wherein to adjust at least one of the dynamic reserve or the buffer margin, the one or more processors, individually or collectively, are further configured to adjust at least one of the dynamic reserve or the buffer margin for each of the radios based on priorities associated with the radios.

28. The apparatus of claim 24, wherein the one or more processors, individually or collectively, are further configured to:

determine a first margin based at least in part on the base reserve, the dynamic reserve, and the buffer margin for each of the radios, allocate a second margin to each of the radios based on the first margin, and determine the transmit power based at least in part on the maximum time-averaged RF exposure limits, the base reserve, the dynamic reserve, the buffer margin, and the second margin for each of the radios.

29. The apparatus of claim 28, wherein to allocate the second margin, the one or more processors, individually or collectively, are further configured to allocate a portion of the first margin to each of the radios as the second margin for each of the radios.

30. The apparatus of claim 28, wherein to allocate the second margin, the one or more processors, individually or collectively, are further configured to allocate the second margin based on a total past RF exposure associated with the radios.

* * * * *